US011290320B2

(12) United States Patent
Brandwine et al.

(10) Patent No.: US 11,290,320 B2
(45) Date of Patent: Mar. 29, 2022

(54) PROVIDING ACCESS TO CONFIGURABLE PRIVATE COMPUTER NETWORKS

(71) Applicant: Amazon Technologies, Inc., Seattle, WA (US)

(72) Inventors: Eric Jason Brandwine, Haymarket, VA (US); Clarissa Loree Cook Brandwine, Haymarket, VA (US); Daniel T. Cohn, Seattle, WA (US); Andrew J. Doane, Vienna, VA (US); Carl J. Moses, Gainesville, VA (US); Stephen E. Schmidt, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/938,999

(22) Filed: Jul. 26, 2020

(65) Prior Publication Data

US 2020/0358651 A1 Nov. 12, 2020

Related U.S. Application Data

(63) Continuation of application No. 13/829,721, filed on Mar. 14, 2013, now Pat. No. 10,728,089, which is a
(Continued)

(51) Int. Cl.
*H04L 12/24* (2006.01)
*H04L 12/46* (2006.01)
(Continued)

(52) U.S. Cl.
CPC ...... *H04L 41/0803* (2013.01); *H04L 12/4641* (2013.01); *H04L 45/586* (2013.01); *H04L 63/0272* (2013.01)

(58) Field of Classification Search
CPC ............ H04L 12/4641; H04L 41/0803; H04L 45/586; H04L 63/0272
See application file for complete search history.

(56) References Cited

U.S. PATENT DOCUMENTS

| 5,642,515 A | 6/1997 | Jones et al. |
| 6,154,843 A | 11/2000 | Hart et al. |

(Continued)

FOREIGN PATENT DOCUMENTS

| CN | 1502195 | 6/2004 |
| CN | 1739105 | 2/2006 |

(Continued)

OTHER PUBLICATIONS

Cohesive Flexible Technologies—VcubeV, retrieved Dec. 9, 2008, from http://www.cohesiveft.com/Developer/, 1 page.
(Continued)

*Primary Examiner* — Jason D Recek
(74) *Attorney, Agent, or Firm* — Robert C. Kowert; Kowert, Hood, Munyon, Rankin & Goetzel, P.C.

(57) ABSTRACT

Techniques are described for providing users with access to computer networks, such as to enable users to interact with a remote configurable network service in order to create and configure computer networks that are provided by the configurable network service for use by the users. Computer networks provided by the configurable network service may be configured to be private computer networks that are accessible only by the users who create them, and may each be created and configured by a client of the configurable network service to be an extension to an existing computer network of the client, such as a private computer network extension to an existing private computer network of the client. If so, secure private access between an existing computer network and new computer network extension that
(Continued)

is being provided may be enabled using one or more VPN connections or other private access mechanisms.

20 Claims, 10 Drawing Sheets

Related U.S. Application Data continuation of application No. 13/491,328, filed on Jun. 7, 2012, now Pat. No. 8,578,003, which is a continuation of application No. 12/332,214, filed on Dec. 10, 2008, now Pat. No. 8,230,050.

(51) Int. Cl.
*H04L 29/06* (2006.01)
*H04L 41/0803* (2022.01)
*H04L 45/586* (2022.01)

(56) References Cited

U.S. PATENT DOCUMENTS

| | | |
|---|---|---|
| 6,278,714 B1 | 8/2001 | Gupta |
| 6,526,581 B1 | 2/2003 | Edson |
| 6,636,983 B1 | 10/2003 | Levi |
| 6,701,437 B1 | 3/2004 | Hoke et al. |
| 7,028,335 B1 | 4/2006 | Borella et al. |
| 7,099,947 B1 | 8/2006 | Nadeau et al. |
| 7,127,742 B2 | 10/2006 | Kramer et al. |
| 7,197,550 B2 | 3/2007 | Cheline et al. |
| 7,249,370 B2 | 7/2007 | Kodama et al. |
| 7,349,951 B2 | 3/2008 | Clough et al. |
| 7,411,975 B1 | 8/2008 | Mohaban |
| 7,426,627 B2 | 9/2008 | Wooten |
| 7,437,769 B2 | 10/2008 | Meyerson |
| 7,457,824 B1 | 11/2008 | Strom et al. |
| 7,483,438 B2 | 1/2009 | Serghi et al. |
| 7,496,685 B2 | 2/2009 | Chen et al. |
| 7,512,715 B2 | 3/2009 | Marks et al. |
| 7,551,614 B2 | 6/2009 | Teisberg et al. |
| 7,574,738 B2 | 8/2009 | Daude et al. |
| 7,580,415 B2 | 8/2009 | Hudson et al. |
| 7,587,588 B2 | 9/2009 | Clemmons, II et al. |
| 7,690,029 B2 | 3/2010 | Kipnis et al. |
| 7,698,388 B2 | 4/2010 | Hoover et al. |
| 7,720,942 B2 | 5/2010 | Bazzinotti et al. |
| 7,752,024 B2 | 7/2010 | Ball et al. |
| 7,802,000 B1 | 9/2010 | Huang et al. |
| 7,827,278 B2 | 11/2010 | Chen et al. |
| 7,840,701 B2 | 11/2010 | Hsu et al. |
| 7,843,912 B2 | 11/2010 | Harris et al. |
| 7,844,718 B2 * | 11/2010 | Polcha ............... H04L 41/0806 709/229 |
| 8,169,903 B2 | 5/2012 | Oz et al. |
| 8,200,773 B2 | 6/2012 | Bluestone et al. |
| 8,223,776 B2 | 7/2012 | Bohacek et al. |
| 8,844,020 B2 | 9/2014 | Doane et al. |
| 9,916,545 B1 | 3/2018 | de Kadt et al. |
| 2002/0002687 A1 | 1/2002 | Chantrain et al. |
| 2002/0013848 A1 | 1/2002 | Rene Salle |
| 2003/0018889 A1 | 1/2003 | Burnett et al. |
| 2003/0041136 A1 | 2/2003 | Cheline et al. |
| 2003/0046390 A1 | 3/2003 | Ball et al. |
| 2003/0061320 A1 | 3/2003 | Grover et al. |
| 2003/0069958 A1 | 4/2003 | Jalava |
| 2003/0112755 A1 | 6/2003 | McDysan |
| 2003/0130833 A1 | 7/2003 | Brownell et al. |
| 2003/0140131 A1 | 7/2003 | Chandrashekhar et al. |
| 2003/0140142 A1 | 7/2003 | Marples et al. |
| 2003/0217126 A1 | 11/2003 | Polcha et al. |
| 2003/0217266 A1 | 11/2003 | Epp et al. |
| 2003/0229690 A1 | 12/2003 | Kitani et al. |
| 2004/0158601 A1 | 8/2004 | Wing et al. |
| 2004/0172555 A1 | 9/2004 | Beringer et al. |
| 2004/0199644 A1 | 10/2004 | Gass et al. |
| 2005/0138204 A1 | 6/2005 | Iyer et al. |
| 2005/0188106 A1 | 8/2005 | Pirbhai et al. |
| 2005/0190769 A1 | 9/2005 | Smith |
| 2005/0192999 A1 | 9/2005 | Cook et al. |
| 2005/0193103 A1 | 9/2005 | Drabik |
| 2005/0268321 A1 | 12/2005 | Milirud et al. |
| 2006/0005240 A1 | 1/2006 | Sundarrajan et al. |
| 2006/0013209 A1 | 1/2006 | Somasundaram |
| 2006/0233166 A1 | 10/2006 | Bou-Diab et al. |
| 2006/0242276 A1 | 10/2006 | Price et al. |
| 2006/0253456 A1 | 11/2006 | Pacholec et al. |
| 2007/0061887 A1 | 3/2007 | Hoover et al. |
| 2007/0192798 A1 | 8/2007 | Morgan |
| 2007/0239987 A1 | 10/2007 | Hoole et al. |
| 2007/0240160 A1 | 10/2007 | Paterson-Jones et al. |
| 2007/0268515 A1 | 11/2007 | Freund et al. |
| 2008/0034200 A1 | 2/2008 | Polcha et al. |
| 2008/0046973 A1 | 2/2008 | Jorgensen |
| 2008/0046996 A1 | 2/2008 | Smith et al. |
| 2008/0144625 A1 | 6/2008 | Wu et al. |
| 2008/0162698 A1 | 7/2008 | Hopen et al. |
| 2008/0162726 A1 | 7/2008 | Hoover et al. |
| 2008/0201486 A1 | 8/2008 | Hsu et al. |
| 2008/0201711 A1 | 8/2008 | Amir Husain |
| 2008/0219276 A1 | 9/2008 | Shah |
| 2008/0225875 A1 | 9/2008 | Wray et al. |
| 2008/0240122 A1 | 10/2008 | Richardson et al. |
| 2008/0307486 A1 | 12/2008 | Ellison et al. |
| 2009/0064287 A1 | 3/2009 | Bagepalli et al. |
| 2009/0089407 A1 | 4/2009 | Chalupa et al. |
| 2009/0089874 A1 | 4/2009 | Mohanty et al. |
| 2009/0141741 A1 | 6/2009 | Kim et al. |
| 2009/0180489 A1 | 7/2009 | Fujita et al. |
| 2009/0217358 A1 | 8/2009 | Kumar et al. |
| 2009/0228541 A1 | 9/2009 | Barsness et al. |
| 2009/0288084 A1 | 11/2009 | Astete et al. |
| 2010/0080238 A1 | 4/2010 | Allan et al. |
| 2010/0094990 A1 | 4/2010 | Ben-Yehuda et al. |
| 2010/0107225 A1 | 4/2010 | Spencer et al. |
| 2010/0111093 A1 | 5/2010 | Satterlee et al. |
| 2010/0223287 A1 | 9/2010 | Lim |
| 2010/0268823 A1 | 10/2010 | Torarp et al. |
| 2011/0022694 A1 | 1/2011 | Dalal et al. |
| 2011/0119390 A1 | 5/2011 | Leech et al. |

FOREIGN PATENT DOCUMENTS

| | | |
|---|---|---|
| CN | 1817000 | 8/2006 |
| CN | 101090356 | 12/2007 |
| CN | 102598591 | 7/2012 |
| EP | 1298853 | 2/2003 |
| EP | 1713231 | 10/2006 |
| JP | 2001273258 | 10/2001 |
| JP | 2003032275 | 1/2003 |
| JP | 2003-124976 | 4/2003 |
| JP | 2003-131923 | 5/2003 |
| JP | 2003-167805 | 6/2003 |
| JP | 2004-503011 | 1/2004 |
| JP | 2005057693 | 3/2005 |
| JP | 2005-217757 | 8/2005 |
| JP | 2006166028 | 6/2006 |
| JP | 2008-537829 | 9/2008 |
| WO | 2007/020120 A1 | 2/2007 |
| WO | 2007/089283 | 8/2007 |
| WO | 2007/126835 A1 | 11/2007 |

OTHER PUBLICATIONS

Cohesive Flexible Technologies—VPN-Cubed, retrieved Dec. 9, 2008, from http://www.cohesiveft.com/vpncubed/, 2 pages.

CohesiveFT Elastic Server: VPN-Cubed: Technical Overview, retrieved Dec. 9, 2008, from http://blog.elasticserver.com/2008/12/vpn-cubed-technical-overview.html, 4 pages.

Cohesive Flexible Technologies—CohesiveFT Frequently Asked Questions, retrieved Dec. 9, 2008, from http://www.cohesiveft.com/FAQ/, 10 pages.

(56) References Cited

OTHER PUBLICATIONS

Enomalism: Elastic Computing Platform—Virtual Server Management: Home—True Elastic Computing, retrieved Aug. 26, 2008, from http://www.enomalism.com/, 2 pages.
Enomalism: Elastic Computing Platform—Virtual Server Management: Home—Open Source Cloud Computing, retrieved Aug. 26, 2008, from http://www.enomalism.com/, 2 pages.
Cohen, R., "ElasticVapor :: Life in the Cloud—Virtual Private Cloud (VPC)," Thursday, May 8, 2008, retrieved Aug. 26, 2008, from http://elasticvapor.com/search/label/Virtualization, 6 pages.
Shigeto, "Security measure course by zone for new security personnel," N+1 Network 5 (11); 120-123, Nov. 1, 2005, 7 pages.
Official Notice of Rejection dated Dec. 2, 2014 in Japanese Patent Application No. 2013-208404 (translation), 3 pages.
"NTT Communications, 'BizCITY for SaaS Provider,' which creates new SaaS business by using a secure SaaS basis," Business Communication 45(12); 26-27, Business Communication Co., Ltd., Japan, Dec. 1, 2008.
Masahiro Satou, et al., "Server Side Networking for Cloud Data Centers", 2012 IEEE 1st International Conference on Cloud Networking (CLOUDNET), Nov. 28, 2012, pp. 17-22.
Kapil Bakshi, "Considerations for Software Defined Networking (SDN): Approaches and Use Cases", AEROSPACE Conference, 2013 IEEE, Mar. 2, 2013, pp. 1-9.
U.S. Appl. No. 15/179,739, filed Jun. 10, 2016, Eric W. Schultze.
U.S. Appl. No. 13/833,945, filed Mar. 15, 2013, Ian Roger Searle.
U.S. Appl. No. 15/728,277, filed Oct. 9, 2017, Kevin Christopher Miller.
U.S. Appl. No. 14/548,196, filed Nov. 19, 2014, Edward Max Schaefer.
U.S. Appl. No. 15/823,185, filed Nov. 27, 2017, Kevin Christopher Miller.
U.S. Appl. No. 14/658,965, filed Mar. 16, 2015, Weili Zhong Mcclenahan.
U.S. Appl. No. 14/736,165, filed Jun. 10, 2015, Colm Maccarthaigh.
U.S. Appl. No. 16/029,468, filed Jul. 6, 2018, Kyle Tailor Akers.
U.S. Appl. No. 14/853,646, filed Sep. 14, 2015, Po-Chun Chen.
U.S. Appl. No. 16/056,078, filed Aug. 6, 2018, David Sean Russell.
U.S. Appl. No. 15/439,751, filed Feb. 22, 2017, Mihir Sadruddin Surani.
U.S. Appl. No. 15/632,258, filed Jun. 23, 2017, Benjamin David Strauss.
U.S. Appl. No. 15/435,138, filed Feb. 6, 2017, Daniel Todd Cohn.
U.S. Appl. No. 15/702,589, filed Sep. 12, 2017, Kevin Christopher Miller.
U.S. Appl. No. 14/822,704, filed Aug. 10, 2015, Daniel Todd Cohn.
U.S. Appl. No. 14/853,608, filed Sep. 14, 2015, Eric Jason Brandwine.
U.S. Appl. No. 15/382,403, filed Dec. 16, 2016, Daniel Todd Cohn.
U.S. Appl. No. 15/011,302, filed Jan. 29, 2016, Eric Jason Brandwine.
U.S. Appl. No. 15/996,371, filed Jun. 1, 2018, Eric Jason Brandwine.
U.S. Appl. No. 15/663,592, filed Jul. 28, 2017, Kevin Christopher Miller.
U.S. Appl. No. 14/067,756, filed Oct. 30, 2013, Daniel T. Cohn.
U.S. Appl. No. 15/061,851, filed Mar. 4, 2016, Eric Jason Brandwine.
U.S. Appl. No. 15/154,818, filed May 13, 2016, Eric Jason Brandwine.

* cited by examiner

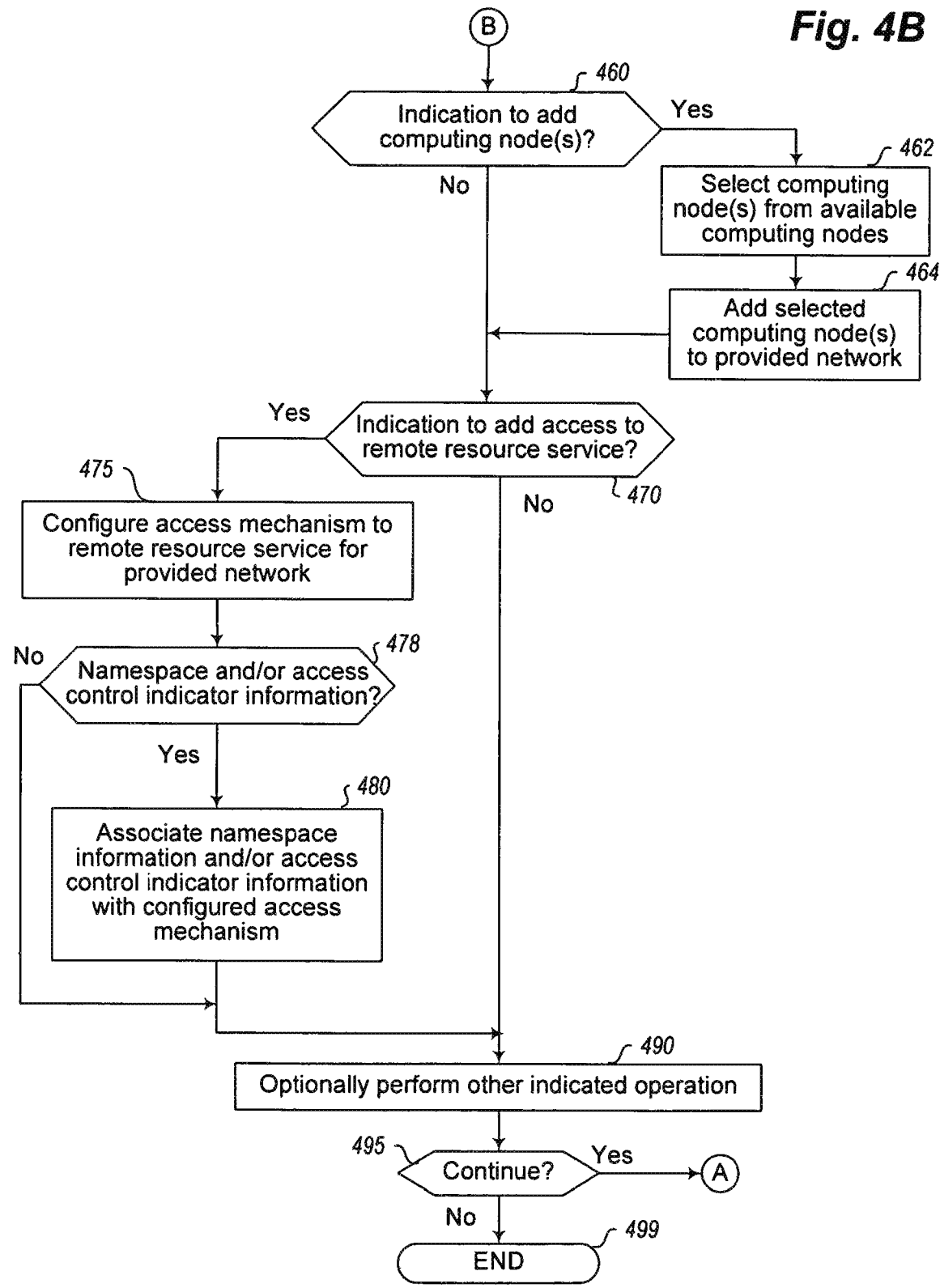

PROVIDING ACCESS TO CONFIGURABLE PRIVATE COMPUTER NETWORKS

This application is a continuation of U.S. patent application Ser. No. 13/829,721, filed Mar. 14, 2013, which is a continuation of U.S. patent application Ser. No. 13/491,328, filed Jun. 7, 2012, now U.S. Pat. No. 8,578,003, which is a continuation of U.S. patent application Ser. No. 12/332,214, filed Dec. 10, 2008, now U.S. Pat. No. 8,230,050, which are hereby incorporated by reference herein in their entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the task of provisioning, administering, and managing the physical computing resources has become increasingly complicated.

The advent of virtualization technologies for commodity hardware has provided some benefits with respect to managing large-scale computing resources for many customers with diverse needs, allowing various computing resources to be efficiently and securely shared by multiple customers. For example, virtualization technologies, such as those provided by VMWare, XEN, or User-Mode Linux, may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span one or more physical resources, such as a single virtual machine with multiple virtual processors that spans multiple distinct physical computing systems.

BRIEF DESCRIPTION OF THE DRAWINGS

FIGS. 4A and 4B illustrate a flow diagram of an example embodiment of a Configurable Network Service Manager routine.

DETAILED DESCRIPTION

Figure 1A:
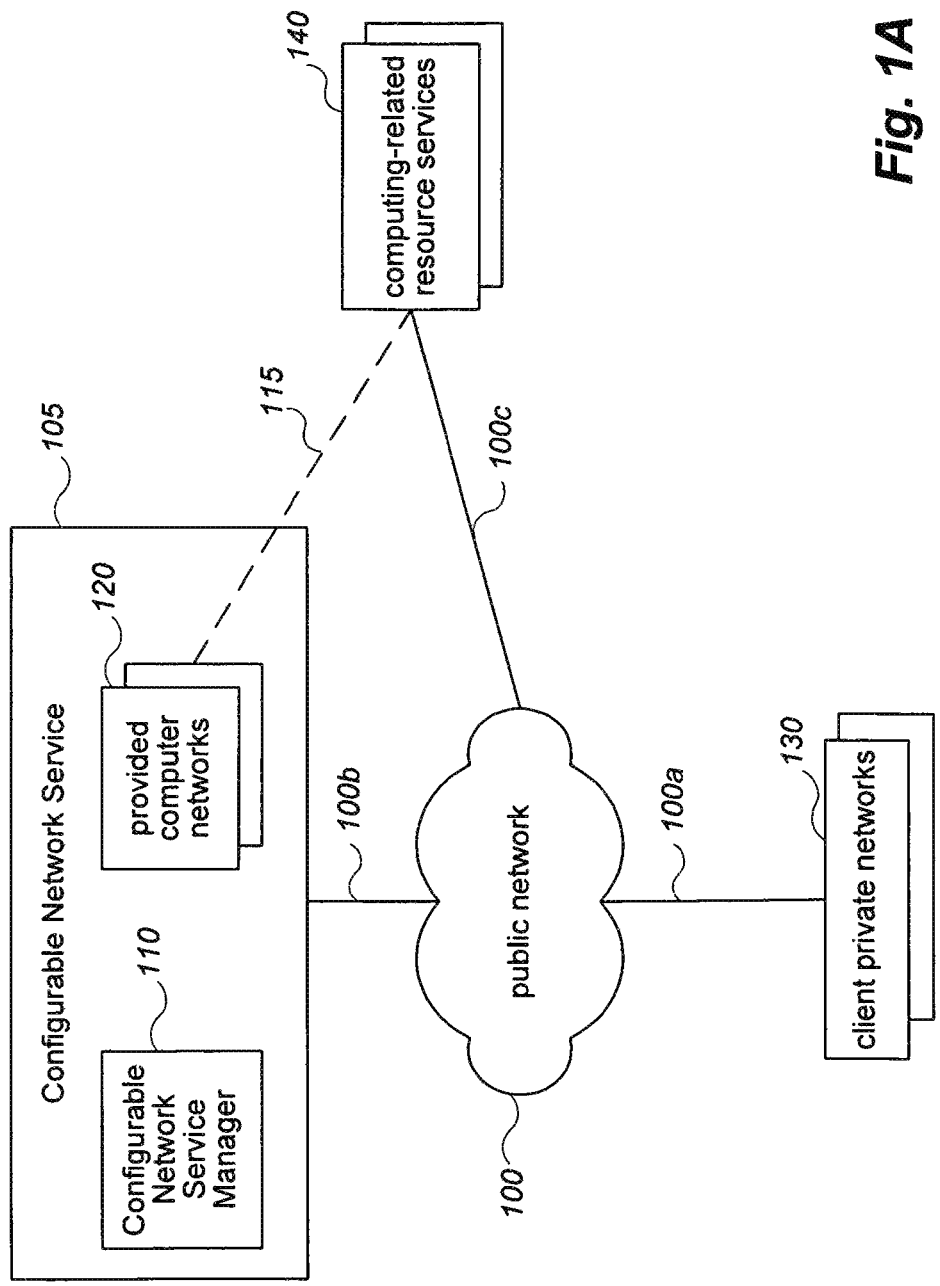
FIGS. 1A and 1B are network diagrams illustrating example embodiments of interactions that involve remote clients creating and configuring private computer networks.

Techniques are described for providing users with access to computer networks, such as under the control of a configurable network service available to remote users. In at least some embodiments, a remote user may interact with a configurable network service over public networks in order to create and configure a computer network for use by the user, with the configured computer network being provided by the configurable network service and including multiple computing nodes that are maintained by or otherwise under the control of the configurable network service. After configuring such a computer network, the user may interact from one or more remote locations with the computer network being provided to the user by the configurable network service, such as to execute programs on the computing nodes of the provided computer network. The configurable network service may in at least some embodiments be a fee-based service, such that users of the configurable network service are customers that pay fees to the configurable network service for at least some of the functionality provided by the configurable network service. In addition, in at least some embodiments, some or all of the described techniques are automatically performed by embodiments of a Configurable Network Service Manager module, optionally in conjunction with other communication manager modules, as described in greater detail below.

In at least some embodiments, at least some of the computer networks provided by the configurable network service are private computer networks that are accessible only by the users of the configurable network service on whose behalf the provided computer networks are created and configured (or by others for whom access is explicitly configured). For example, the configurable network service may provide a user who is a client of the configurable network service with secure private access to a computer network provided for the client, such as by enabling a VPN ("virtual private network") connection or other secure connection between one or more remote computing systems of the client and the provided computer network, or may use other security and/or authentication techniques to enable the client to remotely interact with the provided computer network in a private and secure manner. In addition, in at least some embodiments, at least some of the computer networks provided by the configurable network service are each created and configured by a client to be an extension to an existing computer network of the client, such as a private computer network extension to an existing remote private computer network of the client (e.g., a remote corporate network of a client that is a corporate entity). In such embodiments, secure private access between the existing computer network and the new computer network extension that is being provided may similarly be enabled using one or more VPN connections or other private connections. Additional details related to establishing access of a client to a computer network provided by an embodiment of the configurable network service are included below.

Clients of the configurable network service may create and configure computer networks provided by the configurable network service in various manners in various embodiments. In at least some embodiments, the configurable network service provides one or more APIs ("application programming interfaces") that enable computing systems of clients to programmatically interact with the configurable network service to perform some or all actions in creating, configuring, and initiating use of computer networks provided by the configurable network service, while in at least some embodiments users who are clients of the configurable network service may interactively interact with the configurable network service to perform some or all such actions (e.g., via a GUI, or graphical user interface, or other console provided by the configurable network service), whether instead of or in addition to performing such actions via use of such APIs. In some embodiments, a GUI available to users may be based on an underlying API that is alternatively available to users, while in other embodiments a GUI may be implemented in other manners. In addition, interactions between computing devices of clients and the configurable network service may be based at least in part on electronic messages (e.g., email messages) sent between the client computing devices and the configurable network service, such as in accordance with a message-based API of the configurable network service.

For example, in at least some embodiments, a client may interact with an embodiment of the configurable network service to specify configuration information for a computer network to be provided for the client, with the configuration information optionally including a variety of types of information such as one or more of the following non-exclusive list: multiple specified network addresses to be assigned to multiple computing nodes of the provided computer network; specified network topology information for the provided computer network; and specified network access constraints for the provided computer network. The multiple specified network addresses may include, for example, one or more ranges of network addresses, and if the computer network being provided is an extension to a remote private computer network of a client, may correspond to a subset of virtual and/or private network addresses used for the remote private computer network. The specified network topology information may indicate, for example, subsets of the computing nodes of the provided computer network to be grouped together or that are to otherwise share common intercommunication characteristics, such as by specifying one or more networking devices to be part of the provided computer network (e.g., routers, switches, etc.) and that manage or are otherwise associated with computing nodes having particular specified network addresses, or by otherwise indicating subnets of the provided computer network or other groupings of the computing nodes of the provided computer network. The specified network access constraint information may indicate, for example, for each of one or more of the provided computer network's computing nodes, which other computing nodes may intercommunicate with the computing node and/or the types of communications allowed to and/or from the computing node, including whether the computing nodes of the provided computer network are allowed to communicate with any computing nodes external to the provided computer network (or in cases in which the provided computer network is an extension to an existing other computer network, whether the computing nodes of the provided computer network are allowed to communicate with any computing nodes external to that other computer network to which it belongs). Additional details related to creating and configuring computer networks provided by embodiments of the configurable network service are included below.

In addition, in at least some embodiments, the computing nodes used by the configurable network service to provide computer networks to clients may have various forms, such as physical computing systems and/or virtual machines that are each hosted on one or more physical computing systems. For example, in some embodiments, the configurable network service may include a large number of computing nodes that are provided by the configurable network service to be available for use in computer networks provided to clients, such as in one or more data centers in one or more geographical locations. In addition, in at least some embodiments, some or all of the computing nodes provided by the configurable network service are interconnected by one or more intermediate physical networks, and the computer networks provided to clients may be virtual (or "logical") networks that are overlaid over the intermediate physical networks by using the intermediate physical networks as a substrate network. Furthermore, in at least some embodiments, at least some of the computing nodes may be used by a program execution service (or "PES") that executes multiple programs on behalf of multiple customers or other users of the program execution service. Additional details related to computing nodes and underlying computer networks are included below, and additional details related to example embodiments of providing virtual networks to clients and providing a program execution service are included in U.S. application Ser. No. 11/394,595, filed Mar. 31, 2006 and entitled "Managing Communications Between Computing Nodes;" in U.S. application Ser. No. 11/395,463, filed Mar. 31, 2006 and entitled "Managing Execution of Programs by Multiple Computing Systems;" in U.S. application Ser. No. 11/692,038, filed Mar. 27, 2007 and entitled "Configuring Intercommunications Between Computing Nodes;" in U.S. application Ser. No. 12/060,074, filed Mar. 31, 2008 and entitled "Configuring Communications Between Computing Nodes;" and in U.S. application Ser. No. 11/764,739, filed Jun. 18, 2007 and entitled "Providing Enhanced Access To Remote Services;" each of which is incorporated herein by reference in its entirety.

In some embodiments, a client may further configure a computer network provided by the configurable network service to provide access to one or more other network-accessible services that are remote from the provided computer network, such as other remote network-accessible services that are accessible over the Internet or other public networks, or that are otherwise external to and not part of the provided computer network. At least some such remote services may in some embodiments be affiliated with the configurable network service (e.g., provided by an operator of the configurable network service or an affiliated entity; provided by another client of the configurable network service, such as via a computer network being provided to that other client by the configurable network service, etc.), and at least some such remote services in some embodiments may instead be independent of the configurable network service. Such other remote services may have various forms in various embodiments, including services that provide network access to one or more types of computing-related resources (e.g., storage services that provide access to stored data resources, messaging services that provide access to message queue resources or other stored message resources, database services that provide access to stored database resources, program execution services that provide access to program execution resources, etc.) for use by remote computing systems, or that otherwise provide access to information or functionality or other resources of use (e.g., a service that provides stock quote information resources or search query results resources; a service that provides photo sharing functionality resources or social networking capability resources; etc.). In some situations, an embodiment of the configurable network service may provide a plurality of computing nodes at a data center or other geographical location, and may use subsets of those computing nodes to provide different computer networks to different clients (e.g., with each provided computer network being a distinct virtual network that shares a common substrate network)—in such situations, one client may configure the provided computer network for that client to provide access to one or more network-accessible remote services that are provided by other of the clients using other of the provided computer networks at that geographical location, such as without the one client being aware that those remote resources are physically provided by other computing nodes at the same geographical location.

In at least some embodiments, a client may configure a provided computer network for the client to include a mechanism for accessing a particular resource service, with the access mechanism able to be configured to provide various functionality for that provided computer network. As one particular example, in some embodiments, a provided virtual computer network that has multiple associated virtual network addresses may assign one (or more) of those virtual network addresses to represent a particular remote resource service, so that computing nodes or other participants of the provided computer network may communicate with the remote resource service external to the provided computer network via the representative assigned network address that is local to the provided computer network. In this manner, even a provided computer network that is configured with network access constraints to prevent communications external to the provided computer network (e.g., to prevent communications that would pass through the Internet or one or more other public networks) may be configured to allow communications to a particular external remote resource service via such a configured access mechanism that is part of the provided computer network.

Furthermore, various techniques may be used in at least some embodiments to provide enhanced security for such communications from provided computer networks to remote resource services via configured access mechanisms of the provided computer networks. For example, in at least some embodiments, a particular remote resource service may have a publicly accessible interface that is available to users via the Internet or other public networks (e.g., via one or more public network addresses and associated domain names), but may also implement an interface that is directly accessible from the substrate network that is used by the configurable network service to interconnect computing nodes, such as if the particular remote resource service is provided by the same operator as the configurable network service or is otherwise affiliated with the configurable network service. If such a directly accessible interface is implemented on the substrate network for a particular remote resource service, one or more provided computer networks of the configurable network service may each have a configured access mechanism for that remote resource service that directs communications intended for that remote resource service to that interface implemented on the substrate network, rather than to a remote publicly accessible interface of the remote resource service. That remote resource service may accordingly opt to, in at least some such embodiments and situations, provide some or all of the functionality of the remote resource service for at least some client requests in a manner local to the configurable network service (e.g., if one or more computing nodes of the configurable network service are used to implement that local functionality), while in other embodiments and situations the remote resource service may provide some or all functionality for at least some such client requests by managing communications between the substrate network of the configurable network service over one or more public networks to the remote location of the remote resource service in a secure manner. Alternatively, in at least some embodiments, the configurable network service may perform additional actions for at least some remote resource services to provide secure communications from the configurable network service over one or more public networks to the remote location of the remote resource service in a similar manner, such as by encrypting the communications in a manner that is accessible to the remote resource service and/or by authenticating the communications as being from a trusted source. Additional details related to accessing remote resources from provided computer networks are included below.

Furthermore, in at least some such embodiments, a provided computer network for a client may be configured to receive access to a particular subset of the computing-related resources provided by a network-accessible remote resource service, such as a subset that corresponds to that client. As one example, a remote resource service may use distinct namespaces that partition its provided resources into different groups that have different access rights and that are separately referenced, such that different resources in different namespaces may have the same local name or other identifier but be referenced separately based on those namespaces, and with a particular namespace corresponding to a particular client. If so, a provided computer network for a client may include one or more mechanisms for accessing a particular remote resource service that are each configured to automatically correspond to a particular namespace of that remote resource service, such that computing nodes of the provided computer network may use a configured access mechanism to obtain access to resources within the particular corresponding namespace of that client. Furthermore, in at least some embodiments, the computing nodes of the provided computer network may be unaware of the namespace to which a configured mechanism corresponds, such that a computing node may send a request or other message to the remote resource service that indicates the name or other identifier of a resource of interest within the context of the namespace, but without an actual indication of the namespace. If so, the configured access mechanism may automatically modify or translate the message so that the indicated name or other identifier is associated with the namespace corresponding to the configured access mechanism, with the modifying or translating optionally being transparent to the computing node that sent the message.

The configuring of the provided computer network and the access mechanism representing a remote resource service may be performed in various manners. For example, in some situations a client may specify an existing namespace of the client within the remote resource service, such as a namespace in which the client has previously stored or otherwise used particular resources. Alternatively, in other embodiments, the configurable network service may automatically initiate the use of a new namespace within the remote resource service for new resources that are accessed from the provided computer network, such as by interacting with the remote resource service to create the new namespace. Such interactions with the remote resource service may be performed at various times, such as when the client is creating and configuring the provided computer network, or instead later (e.g., when a computing node on the provided computer network first tries to access the remote resource service via a configured access mechanism). Furthermore, in at least some embodiments and situations, the configurable network service may generate a unique identifier that is associated with the provided computer network and use that identifier to reference the new namespace, while in other embodiments the remote resource service may provide such an identifier or other indication of a new namespace that is created. In either case, the client and computing nodes of the provided computer network may optionally be unaware of the new automatically initiated namespace and/or the unique identifier used by the configurable network service to reference the new namespace. Alternatively, in some embodiments, the client may specify the identifier to be used by the configurable network service to be associated with a computer network provided to the client by the configurable network service, whether or not the client is aware that the identifier will be used by the configurable network service to reference a new namespace or instead in other manners. Furthermore, in at least some embodiments, the identifier associated with a computer network provided to a client may be an identifier associated with the client, such as if the client has a single provided computer network, while in other embodiments the provided computer network identifiers are distinct from any client-specific identifiers. Additional details related to using namespaces are included below.

In addition, in at least some such embodiments, the access mechanism that a provided computer network for a client uses to access resources from a particular remote resource service may be configured to assist the remote resource service in authenticating or validating communications that are received from the provided computer network, such as to validate that the communications are sent from a particular location (e.g., so as to prevent even that same client from accessing particular resources from another location). For example, at least some remote resource services may allow or require that resources provided by the remote resource services each have one or more associated access control indicators (e.g., names or other textual identifiers, numeric identifiers, tags or other access keys, credentials, etc.), such that such a resource may be accessed by an external requester only if the requester supplies all of those associated indicators. For such remote resource services, one of the access control indicators used by the computing nodes of a provided computer network for a client may be an identifier corresponding to that client, such as a customer identifier for that client with that remote resource service. If only that single customer identifier for a client is associated with a resource, then that client may be able to access that resource from other remote computing systems of the client by supplying the same single customer identifier. Such a resource may, for example, be created in response to a request from the client or otherwise accessed and associated (e.g., temporarily) with that client.

However, in at least some embodiments, a configured access mechanism that a provided computer network for a client uses to access resources from a particular remote resource service may be configured to modify communications being sent to the remote resource service to include one or more other additional access control indicators. Such other additional access control indicators may include, for example, an identifier corresponding to the provided computer network that is automatically generated by the configurable network service, and in at least some embodiments the client and/or the computing nodes of the provided computer network may be unaware of the particular additional access control indicators that are used or even unaware of the existence and use of any such additional access control indicators. If the one or more additional access control indicators are not known to the client, then the client may not access those resources other than from the provided computer network via that configured access mechanism, since the client will not otherwise supply all the indicators associated with such a resource in a request for access to that resource. Thus, as previously noted, such additional access control indicators may be used by a remote resource service as an indicator of the source or location of a request for access to a resource, such that requests from other locations are not given access to the resource. Alternatively, requests from other locations may be given different access to such a resource, such as to configure a resource to allow write or other modification access to the resource only if all of the access control indicators for the resource are supplied, but to allow read or other access to the resource in other circumstances, such as by the client from another location if the client-specific identifier is supplied, by anyone without supplying any of the access control indicators, etc. In addition, such additional access control indicators may have various forms, such as an automatically generated random alphanumeric indicator, an indication of an actual geographical location associated with a provided computer network, etc.

In a manner similar to that with the use of namespaces, the configuring of the access mechanism for a provided computer network to use one or more such additional access control indicators may be performed in various manners. For example, in some embodiments a client may specify one or more additional indicators to be associated with a provided computer network for use by a configured access mechanism to a remote resource service. Alternatively, in other embodiments, the configurable network service may automatically initiate the use of one or more new additional indicators for a configured access mechanism to a remote resource service for a provided computer network (e.g., by generating and using a unique identifier that is associated with the provided computer network), such that new resources that are accessed from that remote resource service via that configured access mechanism are accessible only from that provided computer network. In addition, as discussed in greater detail below, some embodiments of the configurable network service may use various modules to manage communications between computing nodes of a provided computer network, such as to facilitate transmission of the communications over a substrate network, and if so one or more such modules may be configured to implement a particular access mechanism by automatically modifying communications to include namespace identifiers and/or access control indicators and/or by forwarding communications (optionally after modification) to a particular remote resource service over one or more public networks. Additional details related to implementing access mechanisms, including to assist remote resource services in validating location-specific communications from provided computer networks, are included below.

In at least some embodiments, the configurable network service further provides an API that enables clients to programmatically interact with the configurable network service to cause the configurable network service to take actions that facilitate establishing remote access of the clients to the computer networks provided to them by the configurable network service. Such a remote access establishment API may perform various actions in various embodiments, and in at least some embodiments assists a client in establishing a VPN connection from a remote location of the client to the computer network being provided for the client by the configurable network service. As previously noted, in some situations a client may have a remote private computer network external to the configurable network service, and the computer network that is created and provided by the configurable network service may be an extension to that remote private network or otherwise connected to that remote private network. In other situations, a client may use one or more other remote computing systems to access and interact with the computer network provided by the configurable network service. In either situation, the client may in at least some embodiments use a VPN connection or other secure connection from the remote private network or other remote computing system(s) to the computer network provided by the configurable network service. In such embodiments, the remote access establishment API provided by the configurable network service may, when programmatically invoked by a client of the configurable network service, cause the configurable network service to initiate provision to the client of one or more appropriate networking components to allow the remote private network or other remote computing system(s) of the client to establish a VPN connection or other secure connection to the computer network provided by the configurable network service. Such networking components may include, for example, one or more hardware devices (e.g., a router or other networking device), software components, and/or groups of configuration information.

For example, in some embodiments, invocation of the remote access establishment API by a client causes the configurable network service to interact with a merchant to purchase or otherwise acquire an appropriate router device or other hardware networking device(s) that are delivered to a remote location of the client, and causes appropriately configured software or other configuration information for the acquired networking device(s) to be delivered to the client, such that the device(s) when configured with the software or based on the configuration information and connected to one or more remote computing systems of the client will initiate contact with the computer network provided for the client by the configurable network service. In this manner, after the networking device(s), software and/or configuration information are received by the client, the client may, for example, attach the received networking device(s) to the remote private network or other remote computing system(s), and use the software and/or configuration information to configure the received networking device(s). The configured networking device(s) may then automatically contact the computer network provided for the client and establish the VPN connection to enable private secure access of the client to the provided computer network. In other situations, the configured networking device(s) may first automatically contact a configured computing system of the configurable network service in order to obtain additional configuration information specific to the computer network provided for the client, and then subsequently automatically establish the VPN connection to that provided computer network.

In such embodiments, the merchant used to supply the networking device(s) to a client may have various forms, such as an online merchant or other retailer that is operated by the same operator who operates the configurable network service or that is otherwise affiliated with the configurable network service, or instead a third-party merchant that is unaffiliated with the configurable network service. The hardware device(s) to be used may similarly be selected in various manners in various embodiments, including based on compatibility with the computer network provided by the configurable network service and/or with the remote computing system(s) in use by the client, such as may be automatically detected and/or specified by the client. Furthermore, in some embodiments, multiple alternatives may be available from which the client may select, such as may be specified by the client when initially invoking the remote access establishment API, or in response to a later query from the configurable network service (e.g., a query that specifies the multiple alternatives from which the client may select). In other embodiments, a single type of networking device or other hardware device may be used. In addition, the configured software and/or other configuration information may be supplied to the client from various sources (e.g., by the same merchant that supplies the networking device(s), directly by the configurable network service, or by another entity), and may be supplied in various manners (e.g., by electronically transmitting the software and/or configuration information to the client; by storing the software and/or configuration information on a physical device-readable medium, such as a DVD or USB memory key, and physically delivering that medium to the client; by storing the software and/or configuration information on the networking device(s) before they are delivered to the client, such as to pre-configure the device(s); etc.). In addition, in some embodiments, configured software that is provided to the client may be sufficient to establish the VPN connection, such as when used with one or more computing systems or other hardware devices that the client already has at the remote location.

Furthermore, the acquisition of a hardware device from a retailer or other third-party entity for a client may be performed in various manners in various embodiments, such as to purchase the device or instead acquire it in another manner (e.g., obtain it for lease, rent, temporary evaluation, etc.), and may in some embodiments include the configurable network service providing payment to the retailer and then separately obtaining payment from the client (e.g., with the payment from the client being more than, less than or the same as the payment to the retailer), or instead having the client provide payment directly to the retailer (e.g., by the configurable network service providing the retailer with payment information for the client, by the configurable network service providing the retailer with information for use in contacting or otherwise interacting with the client to obtain the payment information, by having the retailer use previously obtained information from the client to obtain the payment, etc.). In addition, while in some embodiments the initiated acquisition of a hardware device from a retailer for a client causes the delivery of the hardware device from the retailer directly to a remote location of the client, in other embodiments the configurable network service may perform the acquisition in other manners, such as to initially take delivery of the hardware device and then deliver it to the client (e.g., after configuring the hardware device with appropriate software and/or configuration information, or instead by forwarding the hardware device to the client in the same form that it was received). Additional details regarding actions in various embodiments by the configurable network service to fulfill a client's programmatic invocation of the remote access establishment API are described below.

For illustrative purposes, some embodiments are described below in which specific types of computing nodes, networks, communications, and configuration operations are performed. These examples are provided for illustrative purposes and are simplified for the sake of brevity, and the inventive techniques may be used in a wide variety of other situations, some of which are discussed below. For example, in some embodiments, the computer networks that are created and configured for access by clients are private computer network extensions to existing private computer networks of those clients, while in other embodiments the created and configured computer networks may be stand-alone computer networks that are not extensions to other computer networks and/or may be public computer networks that are not privately accessible by the client on whose behalf they are created and configured. In addition, in some embodiments the computer networks provided by the configurable network service use computing nodes that are provided by and controlled by the configurable network service, while in other embodiments at least some such computing nodes that are used for provided computer networks may be controlled or maintained by others (e.g., by third-parties, by the clients, etc.) but made available for use with the configurable network service.

FIG. 1A is a network diagram illustrating an example embodiment of a configurable network service that enables remote clients to create and configure computer networks for use by the clients. In this example, the computer networks that are created and configured are private network extensions to existing private computer networks of clients, and a Configurable Network Service 105 provides such functionality to clients (not shown) over one or more public networks 100 (e.g., over the Internet). Thus, the remote clients may use the Configurable Network Service ("CNS") 105 to dynamically modify the size and/or capabilities of their private computer networks, such as by using cloud computing techniques over the public networks 100.

In particular, in the example of FIG. 1A, a number of clients (not shown) are interacting over a public network 100 with a Manager module 110 to create and configure various private computer network extensions 120 to remote existing client private networks 130, with at least some of the computer network extensions 120 being configured to enable secure private access from one or more corresponding client private networks 130 over the public network 100 (e.g., via VPN connections established over interconnections 100a and 100b). In this example embodiment, the Manager module 110 assists in providing functionality of the CNS 105 to the remote clients, such as in conjunction with various other modules (not shown) of the CNS 105 and various computing nodes and networking devices (not shown) that are used by the CNS 105 to provide the private computer network extensions 120. In at least some embodiments, the CNS Manager module 110 may execute on one or more computing systems (not shown) of the CNS 105, and may provide one or more APIs that enable remote computing systems to programmatically interact with the module 110 to access some or all functionality of the CNS 105 on behalf of clients (e.g., to create, configure, and/or initiate use of private network extensions 120). In addition, in at least some embodiments, clients may instead manually interact with the module 110 (e.g., via a user interface provided by the module 110) to perform some or all such actions.

The public network 100 may be, for example, a publicly accessible network of linked networks, possibly operated by distinct parties, such as the Internet. The remote client private networks 130 may each include one or more existing private networks, such as a corporate or other private network (e.g., home, university, etc.) that is partially or wholly inaccessible to non-privileged users, and that includes computing systems and/or other networked devices of a client. In the illustrated example, the provided network extensions 120 each include multiple computing nodes (not shown), at least some of which are provided by or otherwise under the control of the CNS 105, and each of the provided network extensions 120 may be configured in various ways by the clients for whom they are provided. Each of the network extensions 120 in the illustrated embodiment may be a private computer network that is accessible only by the client that creates it, although in other embodiments at least some computer networks provided by the CNS 105 for clients may be publicly accessible and/or may be standalone computer networks that are not extensions to other existing computer networks. Similarly, while the provided computer networks 120 in the example are extensions to remote client computer networks 130 that are private networks, in other embodiments the provided computer networks 120 may be extensions to client computer networks 130 that are not private networks.

Private access between a remote client private computer network 130 and corresponding private computer network extension 120 provided for a client may be enabled in various ways, such as by establishing a VPN connection or other secure connection between them that allows intercommunication over the public network 100 in a secure private manner. For example, the CNS 105 may automatically perform appropriate configuration on its computing nodes and other computing systems to enable VPN access to a particular private network extension 120 of a client, such as by automatically configuring one or more VPN mechanisms hosted by the CNS 105 (e.g., software and/or hardware VPN mechanisms), and/or may automatically provide appropriate configuration information to the client (e.g., credentials, access points, and/or other parameters) to allow a VPN mechanism hosted on the remote client private network 130 to establish the VPN access. After VPN access has been appropriately enabled and/or configured, a VPN connection may be established between the remote client private network and the private network extension, such as initiated by the client using IPsec ("Internet Protocol Security") or other appropriate communication technologies. For example, in some embodiments, a VPN connection or other secure connection may be established to or between networks that use MPLS ("Multi Protocol Label Switching") for data transmission, such as instead of an IPsec-based VPN connection. Additional details regarding enabling and establishing secure connections, such as in response to client invocation of a corresponding remote access establishment API provided by the CNS 105, are discussed in greater detail elsewhere.

In addition, in the illustrated embodiment, various network-accessible remote resource services 140 are available to remote computing systems over the public network 100, including to computing systems on the remote client private networks 130. The resource services 140 may provide various functionality to the remote computing systems, such as for at least some of the resource services 140 to provide remote computing systems with access to various types of computing-related resources. Furthermore, at least some of the private network extensions 120 that are provided by the CNS 105 may be configured to provide private or other specialized access to at least some of the remote resource services 140, with that provided access optionally appearing to computing nodes of the private network extensions 120 as being locally provided via virtual connections 115 that are part of the private network extensions 120, although the actual communications with the remote resource services 140 may occur over the public networks 100 (e.g., via interconnections 100*b* and 100*c*). Additional details regarding establishing and using such private or other specialized access to remote resource services are discussed in greater detail elsewhere.

As previously noted, the provided network extensions 120 may each be configured by clients in various manners. For example, in at least some embodiments, the CNS 105 provides multiple computing nodes that are available for use with network extensions provided to clients, such that each provided network extension 120 may include a client-configured quantity of multiple such computing nodes that are dedicated for use as part of the provided network extension. In particular, a client may interact with the module 110 to configure a quantity of computing nodes to initially be included in a computer network provided for the client (e.g., via one or more programmatic interactions with an API provided by the CNS 105). In addition, in at least some such embodiments, computing nodes may later be dynamically added to or removed from a provided computer network of a client (e.g., via one or more programmatic interactions with an API provided by the CNS 105), such as after the provided computer network has already been in use by the client (e.g., by indicating to initiate or terminate execution of particular programs on particular computing nodes). Furthermore, the CNS 105 may provide multiple different types of computing nodes in at least some embodiments, such as, for example, computing nodes with various performance characteristics (e.g., processor speed, memory available, storage available, etc.) and/or other capabilities. If so, in at least some such embodiments, a client may specify the types of computing nodes to be included in a provided computer network for the client.

Figure 1B:
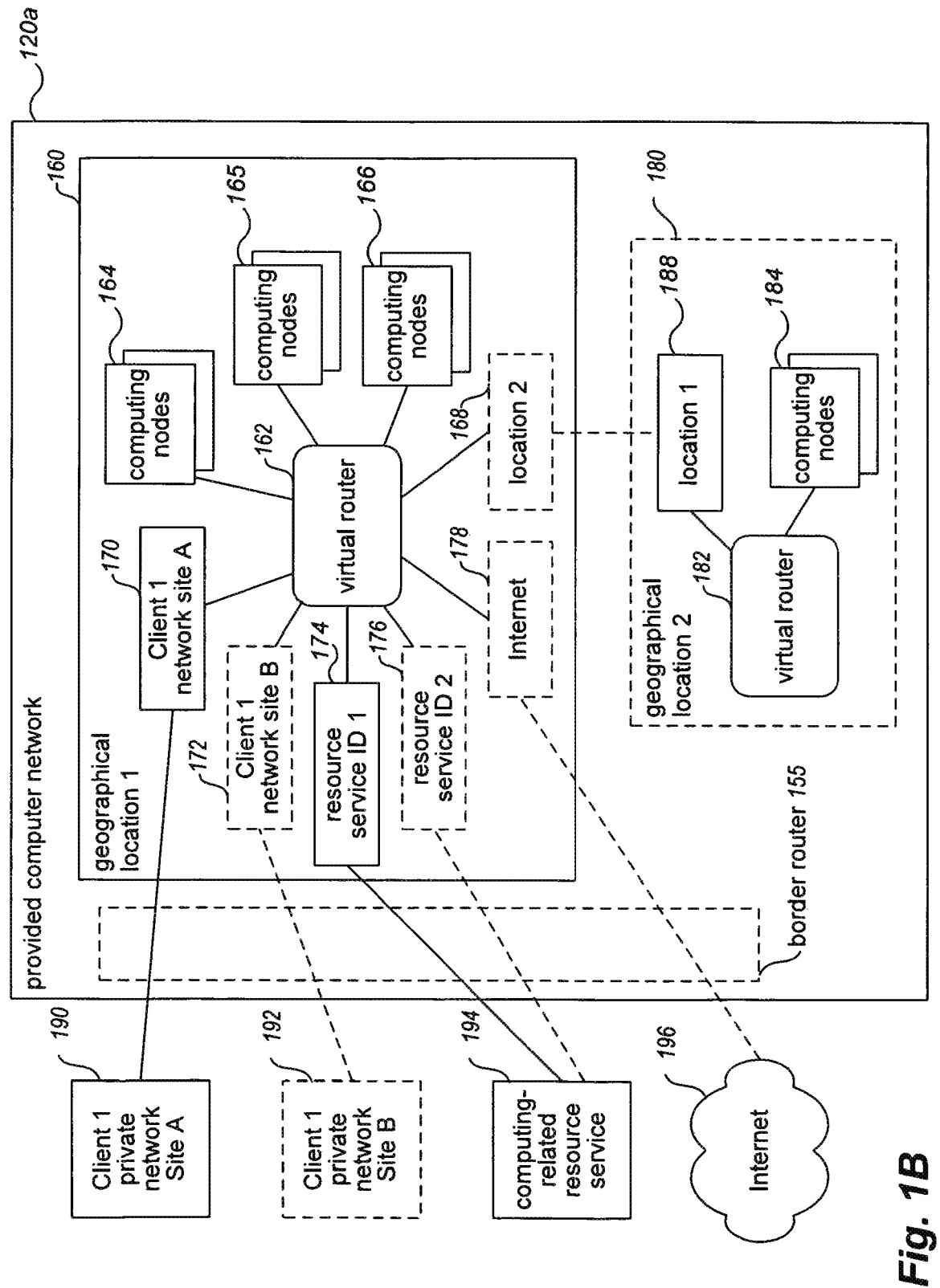

In addition, in at least some embodiments, a client may interact with the module 110 to configure network addresses for a computer network provided for the client (e.g., via one or more programmatic interactions with an API provided by the CNS 105), and network addresses may later be dynamically added, removed or modified for a provided computer network of a client in at least some such embodiments, such as after the provided computer network has already been in use by the client. For example, if a particular provided computer network that is being configured is an extension to an existing remote client computer network, the client may specify one or more address ranges (e.g., a Classless Inter-Domain Routing ("CIDR") address block) or other groups of network addresses that are a subset of the network addresses used by the existing remote client computer network, such that the specified network addresses are used for the computing nodes of the provided computer network. Such configured network addresses may in some situations be virtual or private network addresses that are not directly addressable from computing systems on the public network 100 (e.g., if the existing remote client computer network and the corresponding provided network extension use network address translation techniques and/or virtual networking techniques for the client computer network and its provided network extension), while in other situations at least some of the configured network addresses may be public network addresses that are directly addressable from computing systems on the public network 100 (e.g., a public network address that is a static Internet-routable IP address or other non-changing network address). In other embodiments, the CNS 105 may automatically select network addresses to be used for at least some computing nodes of at least some provided computer network extensions, such as based on network addresses that are available for use by the CNS 105, based on selecting network addresses that are related network addresses used by remote existing computer networks corresponding to the provided computer networks, etc. In addition, in at least some embodiments in which the CNS 105 provides virtual networks to clients, such as by using overlay networks on a substrate network, each client may be allowed to specify any network addresses to be used for their provided computer networks, even if multiple clients specify the same or overlapping network addresses for their respective provided computer networks—in such embodiments, the CNS 105 manages the network addresses distinctly for each client, such that a first client may have a first computing node associated with a particular specified network address for the first client's provided computer network, while a distinct second client may have a distinct second computing node associated with the same particular specified network address for the second client's provided computer network. Once network addresses are configured or otherwise determined for a provided computer network, the CNS 105 may assign the network addresses to various of the computing nodes selected for the provided computer network, such as in a random manner, by using DHCP ("Dynamic Host Configuration Protocol") or other techniques for dynamic assignment of network addresses, etc. In addition, even if public network addresses are used for a particular computer network, the CNS 105 may map one or more of those public network addresses for use in other manners, such as to use a particular public network address to act as an access mechanism for a particular remote resource service as described in greater detail elsewhere, so that communications sent to that particular public network address by computing nodes of that particular computer network will be forwarded to the corresponding remote resource service rather than to another computing system on the Internet or other network to which that particular public network address is assigned. FIG. 1B provides additional details regarding an example of using configured network addresses to route communications within a provided computer network.

In addition, in at least some embodiments, a client may interact with the module 110 to configure network topology information for a computer network provided for the client (e.g., via one or more programmatic interactions with an API provided by the CNS 105), and such network topology information may later be dynamically modified for a provided computer network in at least some such embodiments, such as after the provided computer network has already been in use by the client. For example, a client may specify particular types of networking devices (e.g., routers, switches, etc.) and/or other network devices or nodes (e.g., firewalls, proxies, network storage devices, printers, etc.) to be part of the provided computer network, and/or may specify subsets of the computing nodes of the provided computer network to be grouped together or that are to otherwise share common intercommunication characteristics (e.g., a particular subset of computing nodes that are part of a subnet for which intercommunications are not filtered and/or that are associated with a particular networking device). In addition, the specified configuration information for a provided computer network may in at least some embodiments include routing information or other interconnectivity information between networking devices and/or groups of computing devices. Furthermore, in at least some embodiments, the CNS 105 may provide available computing nodes in multiple geographical locations (e.g., in multiple geographically distributed data centers), and the configuration information specified by a client for a provided computer network may further indicate one or more geographical locations in which computing nodes of the provided computer network are to be located (e.g., to provide fault tolerance among the computing nodes of a provided computer network by having them located in multiple geographical locations), and/or may otherwise provide information about preferences or requirements of how the computing nodes of the provided computer network are to interoperate that is used by the CNS 105 to select one or more such geographical locations (e.g., minimum or maximum network latency or bandwidth for computing node intercommunications; minimum or maximum network proximity between computing nodes; minimum or maximum geographic proximity between computing nodes; having local access to particular resources or functionality that is not available in all such geographic locations; having specified locations relative to other external computing systems, such as to a remote computer network of the client and/or to a remote resource service; etc.).

As discussed in greater detail elsewhere, in at least some embodiments, the interconnections and intercommunications between computing nodes of a provided computer network are managed using an underlying substrate network of the CNS 105, and if so, some or all of the configured network topology information may be simulated in at least some such embodiments using the underlying substrate network and corresponding modules of the CNS 105. For example, each of the computing nodes provided by the CNS 105 may be associated with a node communication manager module of the CNS 105 that manages communications to and from its associated computing nodes. If so, firewall devices may be simulated by using the associated communication manager module for a computing node to disallow or otherwise handle communications to and/or from the computing node in a manner consistent with one or more simulated firewall devices. Such node communication manager modules may similarly simulate routers and subnets by controlling how and whether intercommunications are passed between computing nodes, and by responding to requests from computing nodes for information (e.g., ARP, or address resolution protocol, requests) with appropriate response information. One or more external communication manager modules of the CNS 105 may manage communications between the computing nodes provided by the CNS 105 and external computing systems, such as to similarly simulate firewall devices and enforce specified network access constraints, as well as to manage configured access mechanisms for remote resource services and secure connections to remote client private computer networks. Other types of network topology information may be similarly simulated, and additional details regarding the use of various modules of the CNS 105 in some embodiments are discussed below with respect to FIG. 2 and elsewhere.

In addition, in at least some embodiments, a client may interact with the module 110 to configure various network access constraint information for a computer network provided for the client (e.g., via one or more programmatic interactions with an API provided by the CNS 105), and such network access constraint information may later be dynamically modified for a provided computer network in at least some such embodiments, such as after the provided computer network has already been in use by the client. For example, a client may specify information about whether and how some or all of the computing nodes of a provided computer network are allowed to communicate with other computing nodes of the provided computer network and/or with other external computing systems, such as based on one or more of the following: directions of communications (incoming versus outgoing); types of communications (e.g., based on the types of content included and/or the types of communication protocols used, such as to allow HTTP requests for text but not images and to not allow FTP requests); locations of other computing systems (e.g., whether part of the provided computer network, part of a remote client computer network corresponding to the provided computer network, part of a remote resource service to which private or other specialized access has been established, external to the provided computer network and any corresponding remote client computer network, etc.); types of other computing systems; etc. In addition, as discussed in greater detail elsewhere, in at least some embodiments a provided computer network may be configured to provide private or other specialized access to one or more remote resource services, such as via a configured access mechanism that is part of or otherwise local to the provided computer network. In a manner similar to that for network topology information and other routing information, the CNS 105 may enforce network access constraint information for provided computer networks in various manners. Additional details related to managing communications for provided computer networks in some embodiments are discussed below with respect to FIG. 2 and elsewhere.

Figure 2:
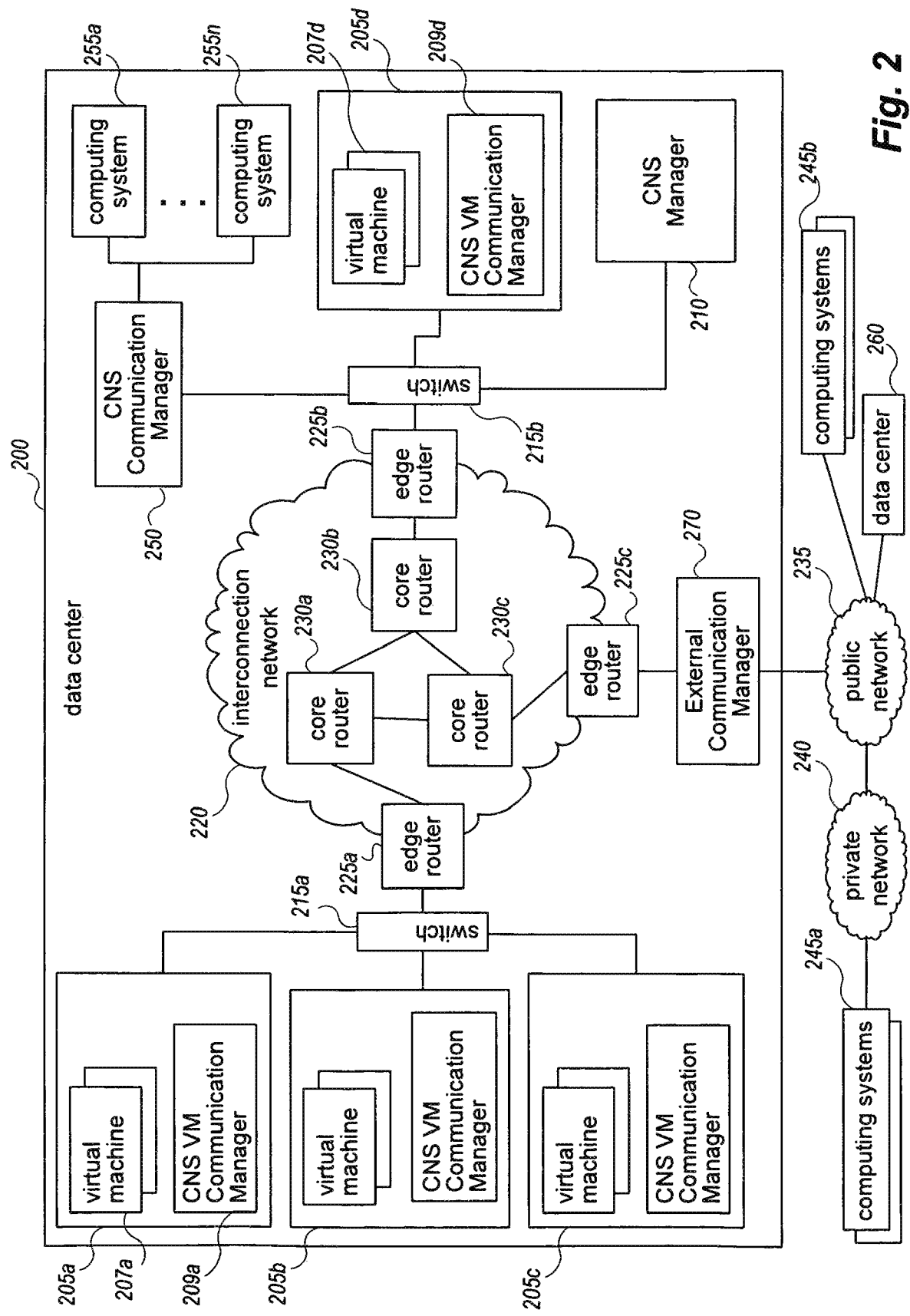
FIG. 2 is a network diagram illustrating an example embodiment of interconnected computing systems for use in providing computer networks to clients.

FIG. 1B illustrates additional details regarding an example computer network 120a that may be provided by the CNS 105 (or other embodiment of a configurable network service) for a client, with the provided computer network 120a in this example being a private network extension to a remote private computer network of the client, such as one of the remote private computer networks 130 of FIG. 1A. In this example, various connections and communication paths for the provided computer network 120a are shown in a conceptual manner to illustrate types of configurable network access constraints and network topology, and FIG. 2 illustrates additional details regarding an example of underlying substrate networks and connections that may be used to create provided computer networks such as the example provided computer network 120a.

In particular, in FIG. 1B, the provided computer network 120a includes various computing nodes provided by the CNS 105 that are located at a first geographical location 1 160 (e.g., at a first data center at the geographical location 1), with the various computing nodes being configured into logical groups 164, 165 and 166 in this example (e.g., to correspond to different subnets and/or associated configured networking devices, not shown). In this example, a single conceptual virtual router 162 is shown at geographical location 1 to control communications between those computing nodes and other computing systems, so as to illustrate different types of communications that may occur, although the provided computer network 120a may actually have multiple or no configured networking devices at geographical location 1, and the computer network 120a may be implemented by the configurable network service at the geographical location 1 in various manners, such as via multiple physical interconnected routers or other networking devices, by using an underlying substrate network and associated modules that control communications over the underlying substrate network, etc. In this example, the virtual router 162 operates in accordance with the configured information for the provided computer network 120a, including configured network topology information, configured private or other specialized access to remote resource services, and other configured network access constraint information, such as to route communications that are sent to network addresses within the provided computer network 120a to corresponding destination computing nodes on the provided computer network 120a, and to route other communications to other network addresses outside of the provided computer network 120a as appropriate. Furthermore, communications that are not permitted by configured firewall devices, configured network topology information, or other configured network access constraints may be blocked or otherwise managed by the virtual router 162.

In this example, the computer network 120a is provided for an example Client 1, and is a network extension to a remote computer network of Client 1. Client 1's remote computer network includes multiple computing systems (not shown) at a first remote location Site A 190, and the virtual router 162 is configured to communicate with those multiple computing systems via a virtual communication link 170 at the geographical location 1. For example, as discussed in greater detail elsewhere, the provided computer network 120a may include one or more configured VPN connections to the multiple computing systems at Site A 190, and the communication link 170 may correspond to one or more such VPN connections. In addition, the remote computer network of Client 1 may optionally include computing systems at one or more other locations, such as the illustrated optional Site B 192, and if so the virtual router 162 may further be configured to communicate with those other computing systems at the other locations, such as via an optional virtual communication link 172 to Site B 192 (e.g., via one or more other configured VPN connections directly to Site B). When multiple VPN connections or other secure connections are used to remote computing systems of a remote computer network, each connection may correspond to a subset of the remote computing systems (e.g., by being associated with a subset of the network addresses of the remote computer network that correspond to those remote computing systems), so as to cause communications to be routed to the appropriate connection. In other embodiments, multiple VPN connections or other secure connections may be used to remote computing systems at one or more locations, but may each support communications to any of the remote computing systems, such as if the multiple connections are redundant alternatives (e.g., used for load balancing). Furthermore, in some embodiments, a client's remote computer network may include multiple computing systems at multiple sites, but only a single VPN connection or other secure connection to the remote computing systems may be used, with the remote computer network being responsible for routing the communications to the appropriate site and computing system.

In addition, the provided computer network 120a may be configured to allow all, some or no communications between the computing nodes of the provided computer network 120a and other external computing systems that are generally accessible on the Internet 196 or other public networks. If at least some such external communications are allowed, the virtual router 162 may further be configured to communicate with those external multiple computing systems via an optional virtual communication link 178 of the provided computer network 120a, such as in conjunction with an optional virtual border router 155 for the provided computer network 120a. The virtual border router 155 may be physically implemented in various manners, such as by the CNS 105 using one or more actual firewall devices or border router devices that manage communications between external computing systems and the various computing nodes provided by the CNS 105 at geographical location 1 (e.g., actual devices that support numerous computer networks provided by the CNS 105 to clients that use those computing nodes of the CNS 105), by using an underlying substrate network and associated modules that control communications over the underlying substrate network (e.g., to prevent disallowed communications from being sent by computing nodes of the provided computer network 120a onto the substrate network), etc. Furthermore, the virtual border router 155 may further conceptually assist in managing other communications to other computing systems external to the provided computer network 120a, such as to the remote client computer network at Sites A and B, to one or more remote resource services, etc.

In addition, the provided computer network 120a may be configured to provide private or other specialized access to one or more remote resource services, such as by assigning one or more network addresses of the provided computer network 120a to represent those one or more remote resource services, and by optionally configuring particular actions to be taken for communications sent to those assigned network addresses. In this example, the virtual router 162 has been configured to provide local access to remote resource service 194 via a virtual communication link 174 of the provided computer network 120a. Thus, for example, if one of the computing nodes of the provided computer network 120a sends a communication to a particular network address of the provided computer network 120a that is mapped to the communication link 174, the virtual router may forward that communication to the remote resource service 194 external to the provided computer network 120a (e.g., via the Internet or other public networks). In other embodiments, the remote resource service 194 may implement an interface that is part of the CNS 105 or otherwise at the geographical location 1, and if so the communications sent to the particular network address of the provided computer network 120a that is mapped to the communication link 174 may instead be forwarded to that interface of the remote resource service for handling.

In addition, the virtual communication link 174 may be configured in at least some embodiments to manage communications sent via the link in various manners, such as to modify those communications in one or more manners before they are forwarded to the remote resource service 194, or to otherwise access the remote resource service 194 in a specialized manner. For example, in the illustrated embodiment, the virtual communication link 174 may be configured to correspond to a particular namespace within the remote resource service 194, with a subset of the computing-related resources provided by the remote resource service 194 being part of that namespace. Accordingly, the virtual communication link 174 may be configured to access resources within the particular namespace, such as by modifying or translating communications to use a name or other identifier associated with the particular namespace, by using a particular interface of the remote resource service that supports indicating a particular namespace, etc. In addition, if the virtual communication link 174 is configured to correspond to a particular namespace or to otherwise correspond to a subset of the resources provided by the remote resource service 194, the provided computer network 120a may optionally be further configured to include one or more other virtual communication links that also correspond to the same remote resource service 194 but are configured to access the remote resource service 194 in other manners. For example, the provided computer network 120a may optionally include a distinct virtual communication link 176 that is configured to access the remote resource service 194 in a distinct manner than that of virtual communication link 174, such as to correspond to a distinct second namespace, to not correspond to any particular namespace, to use an identifier of a customer of the remote resource service 194 that is distinct from a customer identifier used for communication link 174, etc. In this example, the virtual communication links 174 and 176 are configured to use different identifiers (e.g., different namespace identifiers), which are represented in this example as ID 1 and ID 2 for the links 174 and 176, respectively. Thus, the computing nodes of the provided computer network 120a may be able to access different types of functionality from remote resource 194. Furthermore, while not illustrated here, the provided computer network 120a may be similarly configured to access one or more other remote resource services (not shown) using other virtual communication links to those other remote resource services.

In addition to or instead of configuring the virtual communication link 174 to access a particular namespace of the remote resource service 194, the virtual communication link may be configured in at least some embodiments to provide additional information to the remote resource service 194 to allow the remote resource service 194 to validate the location or other source of the communications as being the provided computer network 120a. For example, in the illustrated embodiment, the virtual communication link 174 may be configured to correspond to one or more particular identifiers or other access control indicators that are associated with the provided computer network 120a by the configurable network service or by the remote resource service 194, so that a subset of new and/or existing computing-related resources provided by the remote resource service 194 that are accessed via the virtual communication link 174 are associated with the access control indicator(s), for use by the remote resource service 194 in restricting access to those resources. Accordingly, the virtual communication link 174 may be configured to use the specified additional indicator(s) associated with the provided computer network 120a in various manners, such as to modify communications to include the additional indicator(s), to send the additional indicator(s) along with the communications without modification of the communications, to use a particular interface of the remote resource service that supports including such additional indicator(s), etc. In addition, if the virtual communication link 174 is configured to correspond to one or more additional indicators, the provided computer network 120a may optionally be further configured to include one or more other virtual communication links that also correspond to the same remote resource service 194 but are configured to access the remote resource service 194 in other manners. For example, the provided computer network 120a may optionally configure the distinct virtual communication link 176 to access the remote resource service 194 without using any additional indicators (e.g., to provide the same access to the remote resource service 194 as would otherwise be publicly available), to use one or more other additional access control indicators that are distinct from those used with virtual communication link 174, to use an identifier of a customer of the remote resource service 194 that is distinct from a customer identifier used for virtual communication link 174, etc. Furthermore, while not illustrated here, the provided computer network 120a may be similarly configured to access one or more other remote resource services (not shown) using other virtual communication links to those other remote resource services, such as other virtual communication links that are configured to use the same one or more additional indicators as virtual communication link 174, or that are otherwise configured.

In the illustrated embodiment, in addition to the computing nodes of the CNS 105 at geographical location 1, the provided computer network 120 may further include computing nodes 184 provided by the CNS 105 that are located at a second geographical location 2 180 (e.g., at a distinct second data center at the geographical location 2). Accordingly, the virtual router 162 may be configured to include an optional virtual communication link 168 to the portion of the provided computer network 120a at the geographical location 2. In this example, the portion of the provided computer network 120a at the geographical location 2 similarly is illustrated with a conceptual virtual router 182 to manage communications to and from the computing nodes 184, including to communicate with the portion of the provided computer network 120 at the geographical location 1 via a virtual communication link 188. Such communications between computing nodes of the CNS 105 at different geographical locations may be handled in various manners in various embodiments, such as by sending the communications over the Internet or other public networks (e.g., as part of a secure tunnel, such as that uses encryption supported by the CNS 105), by sending the communications in a private secure manner (e.g., via a dedicated lease line between the geographical locations), etc. In addition, while not illustrated here, the portion of the provided computer network 120a at the geographical location 2 may similarly include some or all of the same types of other virtual communication links illustrated for the portion at geographical location 1, such as to a remote client private network (e.g., via one or more VPN connections distinct from any VPN connections to the geographical location 1), to remote resource services, to the Internet, etc.

It will be appreciated that the example provided computer network 120a of FIG. 1B is included for exemplary purposes, and that other computer networks provided by the CNS 105 for clients may not include all of the types of configured communications links and network topology information, and/or may include other types of configured communications links and network topology information that is not illustrated here. For example, in some embodiments and situations, a provided computer network may include configured devices and other resources in addition to or instead of computing nodes, and if so, each such other resource may optionally be assigned a network address of the provided computer network. Furthermore, the conceptual devices and communication links illustrated in FIG. 1B may be implemented using a variety of types of underlying physical devices, connections and modules. In addition, while not illustrated here, clients may perform a variety of other types of interactions with remote resource services, whether from provided computer networks or instead other remote computing systems, such as to subscribe/register to use resource, receive/create various credentials (e.g., user IDs, passwords, etc.), create resources and/or namespaces from other remote computing systems (e.g., that are part of a remote private corporate network) that are later accessed from a provided computer network (e.g., a network extension to the private corporate network), etc.

FIG. 2 is a network diagram illustrating an example embodiment of computing systems for use in providing computer networks, such as by an embodiment of a configurable network service. In particular, in this example, a number of physical computing systems are co-located in a data center 200 and are interconnected via various networking devices and one or more physical networks. The physical computing systems and other devices are used in this example by a configurable network service to provide multiple computer networks for clients, by establishing and maintaining each of the provided computer networks as a virtual network, and by using the physical network(s) as a substrate network on which the virtual networks are overlaid. For example, with respect to the example of FIG. 1B, the data center 200 may be located at geographical location 1, and the illustrated physical computing systems may be used to provide the computing nodes 164, 165 and 166 of provided computer network 120a. The use of the overlay networks and underlying substrate network may be transparent to the computing nodes of the provided computer networks in at least some embodiments.

Thus, in this example, the computer networks provided by the configurable network service are implemented as virtual overlay networks that send communications via an underlying physical substrate network. The provided virtual overlay networks may be implemented in various ways in various embodiments, such as without encapsulating communications in some embodiments (e.g., by embedding virtual network address information for a virtual network in communications configured for a networking protocol of the physical substrate network). As one illustrative example, a virtual network may be implemented using 32-bit IPv4 ("Internet Protocol version 4") network addresses, and those 32-bit virtual network addresses may be embedded as part of 128-bit IPv6 ("Internet Protocol version 6") network addresses used by the physical substrate network, such as by re-headering communication packets or other data transmissions (e.g., using Stateless IP/ICMP Translation, or SIIT), or otherwise modifying such data transmissions to translate them from a first networking protocol for which they are configured to a distinct second networking protocol. As another illustrative example, both the virtual network and substrate network may be implemented using the same network addressing protocol (e.g., IPv4 or IPv6), and data transmissions sent via the provided virtual overlay network using virtual network addresses may be modified to use different physical network addresses corresponding to the substrate network while the transmissions are sent over the substrate network, but with the original virtual network addresses being stored in the modified data transmissions or otherwise tracked so that the data transmissions may be restored to their original form when they exit the substrate network. In other embodiments, at least some of the overlay networks may be implemented using encapsulation of communications.

The illustrated example of FIG. 2 includes a data center 200 with multiple physical computing systems operated by an embodiment of the configurable network service. The data center 200 is connected to one or more public networks 235 external to the data center 200, which provide access to one or more remote computing systems 245a via private network 240, to one or more other globally accessible data centers 260 that each have multiple computing systems at other geographical locations, and to one or more other remote computing systems 245b. The public network 235 may be, for example, a publicly accessible network of networks, possibly operated by various distinct parties, such as the Internet, and the private network 240 may be, for example, a corporate network that is wholly or partially inaccessible from computing systems external to the private network 240. Computing systems 245b may each be, for example, a home computing system that connects directly to the Internet (e.g., via a telephone line, cable modem, a Digital Subscriber Line ("DSL"), etc.)

In this example, the configuring of the virtual provided computer networks is facilitated by a manager module 210 of the configurable network service, and multiple other modules of the configurable network service are used to implement functionality of the provided computer networks, such as from the edge of the physical substrate network by modifying communications that enter and/or leave the substrate network. In particular, in this example, multiple node communication manager modules of the configurable network service each manage communications to and from associated computing nodes, such as the illustrated node communication manager modules 209a, 209d and 250 as discussed in greater detail below. In addition, in this example, an external communication manager module 270 of the configurable network service manages communications between the physical computing systems within the data center 200 and external computing systems, as discussed in greater detail below. While only a single external communication manager module 270 is illustrated in this example, it will be appreciated that the functionality of the module 270 may be implemented using multiple devices, such as for redundancy and load balancing.

The data center 200 includes a number of physical computing systems 205a-205d and 255a-255n, as well as a CNS node communication manager module 250 that executes on one or more other computing systems (not shown) to manage communications for the associated computing systems 255a-255n, and a manager module 210 of the configurable network service that executes on one or more computing systems (not shown). In this example embodiment, each physical computing system 205a-205d hosts multiple virtual machine computing nodes and also includes a virtual machine ("VM") node communication manager module (e.g., as part of a virtual machine hypervisor monitor for the physical computing system), such as the CNS VM node communication manager module 209a and virtual machines 207a on computing system 205a, and such as CNS VM node communication manager module 209d and virtual machines 207d on computing system 205d. Each of the virtual machine computing nodes may be used by the configurable network service as a distinct computing node of a computer network provided for a client. Physical computing systems 255a-255n do not execute any virtual machines in this example, and thus may each act as a distinct computing node that is part of a computer network provided for a client by the configurable network service. In other embodiments, all or none of the physical computing systems at the data center may host virtual machines.

This example data center further includes multiple physical networking devices, such as switches 215a and 215b, edge routers 225a-225c, and core routers 230a-230c. Switch 215a is part of a physical network that includes physical computing systems 205a-205c, and is connected to edge router 225a. Switch 215b is part of a distinct physical network that includes physical computing systems 205d, 255a-255n, and the computing system(s) providing the CNS node communication manager module 250 and the CNS system manager module 210, and is connected to edge router 225b. The physical networks established by switches 215a-215b, in turn, are connected to each other and other networks (e.g., the public network 235) via an intermediate interconnection network 220, which includes the edge routers 225a-225c and the core routers 230a-230c. The edge routers 225a-225c provide gateways between two or more networks. For example, edge router 225a provides a gateway between the physical network established by switch 215a and the interconnection network 220. Edge router 225c provides a gateway between the interconnection network 220 and public network 235. The core routers 230a-230c manage communications within the interconnection network 220, such as by forwarding packets or other data transmissions as appropriate based on characteristics of such data transmissions (e.g., header information including source and/or destination substrate network addresses, protocol identifiers, etc.) and/or the characteristics of the interconnection network 220 itself (e.g., routes based on physical network topology, etc.).

The illustrated node communication manager modules manage communications sent to and from associated computing nodes. For example, node communication manager module 209a manages associated virtual machine computing nodes 207a, node communication manager module 209d manages associated virtual machine computing nodes 207d, and each of the other node communication manager modules may similarly manage communications for a group of one or more other associated computing nodes. The illustrated node communication manager modules may manage communications between computing nodes so as to overlay a particular virtual network over the intermediate physical substrate network (e.g., the interconnection network 220 and the physical networks associated with switches 215a and 215b), and may implement firewall policies and other network access constraints to control such communications. The external communication manager module 270 manages external communications that enter and leave the data center 200, such as to further implement the overlay networks over the substrate network within the data center 200 with regard to such external communications. The external communication manager module 270 may take actions to implement firewall policies and other network access constraints, including at least some configured access mechanisms for provided computer networks that allow private or other specialized access to remote resource services external to the data center 200, and optionally at least some VPN connections to external remote client computer networks, or may instead operate in conjunction with other hardware and/or software (not shown) that implements the configurable network service's portion of such VPN connections.

Thus, as one illustrative example, one of the virtual machine computing nodes 207a on computing system 205a may be part of a particular provided virtual computer network (e.g., provided computer network 120a of FIG. 1B) for a client, along with one of the virtual machine computing nodes 207d on computing system 205d and with the computing system 255a (and optionally other computing nodes in this data center or in one or more other data centers 260 that are also used by the configurable network service), and with IPv4 being used to represent the virtual network addresses for the virtual network. Other of the virtual machine computing nodes 207a, virtual machine computing nodes 207d, and computing systems 255b-255n (as well as other of the illustrated computing nodes) may be currently dedicated to other computer networks being provided to other clients, may be currently unassigned to a provided computer network and available for use by the configurable network service, and/or may also be part of the same particular provided virtual computer network. A program executing for the client on the virtual machine computing node 207a that is part of the particular provided virtual computer network may then direct an outgoing communication (not shown) to the virtual machine computing node 207d of the particular provided virtual computer network, such as by specifying a virtual network address for that provided virtual computer network that is assigned to that destination virtual machine computing node 207d. The node communication manager module 209a receives the outgoing communication, and in at least some embodiments determines whether to authorize the sending of the outgoing communication, such as based on previously configured information about the sending virtual machine computing node 207a and/or about the destination virtual machine computing node 207d, and/or by dynamically interacting with the system manager module 210 (e.g., to obtain an authorization determination, to obtain some or all such information, etc.).

If the node communication manager module 209a determines that the outgoing communication is authorized (or does not perform such an authorization determination), the module 209a determines the actual physical substrate network location corresponding to the destination virtual network address for the communication. In this example, the interconnection network uses IPv6 to represent the actual network addresses for computing nodes connected via the interconnection network, and the module 209a re-headers the outgoing communication so that it is directed to node communication manager module 209d using an actual IPv6 substrate network address. The node communication manager module 209a may determine the actual IPv6 destination network address to use for the virtual network address of the destination virtual computing node 207d by, for example, dynamically interacting with the system manager module 210, or may have previously determined and stored that information (e.g., in response to a prior request from the sending virtual machine computing node 207a for information about that destination virtual network address, such as a request using Address Resolution Protocol, or ARP). In this example, the actual IPv6 destination network address that is used embeds the virtual destination network address and additional information, so as to send the communication over the overlay network without encapsulation.

When the node communication manager module 209d receives the communication via the interconnection network 220, it extracts the virtual destination network address and additional information from the actual IPv6 destination network address, and determines to which of the virtual machine computing nodes 207d that the communication is directed. The node communication manager module 209d next optionally determines whether the communication is authorized for the destination virtual machine computing node 207d, such as by extracting the virtual source network address and additional information from the actual IPv6 source network address, and confirming that the computing node with that virtual source network address is actually managed by the node communication manager module that forwarded the communication (in this example, node communication manager module 209a), so as to prevent spoofing of source network addresses by malicious senders. If the communication is determined to be authorized (or the node communication manager module 209d does not perform such an authorization determination), the module 209d then re-headers the incoming communication so that it is directed to the destination virtual machine computing node 207d using an appropriate IPv4 network address for the virtual network, such as by using the sending virtual machine computing node's virtual network address as the source network address and by using the destination virtual machine computing node's virtual network address as the destination network address. After re-headering the incoming communication, the module 209*d* then forwards the modified communication to the destination virtual machine computing node. In at least some embodiments, before forwarding the incoming communication to the destination virtual machine, the module 209*d* may also perform additional steps related to security. For example, the module 209*d* may verify that the sending virtual machine computing node is authorized to communicate with the destination virtual machine (e.g., based on belonging to the same virtual network and/or on network access constraint information specified for that provided virtual network, being associated with the same customer or other entity, being associated with different entities whose computing nodes are authorized to intercommunicate, etc.) and/or that the incoming communication is of an allowed type, such as based on information previously obtained by the module 209*d* or based on interacting with the system manager module 210.

If the sending virtual machine computing node 207*a* instead (or in addition) directs an outgoing communication (not shown) to one or more intended destination computing systems external to the data center 200, the node communication manager module 209*a* receives and handles the outgoing communication in a similar manner. An intended external destination computing system may be, for example, another computing node that is part of the same particular provided virtual computer network (e.g., on a remote virtual client computer network for which the particular provided computer network is an extension, or at another data center 260 that is also used by the configurable network service to provide a portion of the particular virtual computer network), a computing system of a remote resource service, a computing system that is publicly accessible on the Internet, etc. In at least some embodiments and situations, the module 209*a* may first determine whether to authorize the sending of the outgoing communication, and if so determines the actual physical substrate network location corresponding to the destination network address for the communication. In this example, the determined physical substrate network location corresponds to the external communication manager module 270, such as if the module 270 is associated with all virtual and/or actual network addresses that are not otherwise assigned to node communication manager modules. When the module 270 receives the communication via the interconnection network 220, it similarly extracts the destination network address and additional information from the received communication, and determines whether and how to forward the communication, including optionally determining whether the communication is authorized for the intended destination. If the communication is determined to be authorized (or the module 270 does not perform such an authorization determination), the module 270 then re-headers the incoming communication so that it is directed to the destination using an appropriate IPv4 public network address (or other network address appropriate for the public network 235), and then forwards the modified communication over the public network 235.

Thus, as noted above, the external communication manager module 270 handles outgoing communications from provided computer networks in the illustrated embodiment, including outgoing communications sent to remote resource services via configured access mechanisms for those remote resource services. If the outgoing communication is being sent to a remote resource service via a configured access mechanism for the particular provided computer network, the module 270 and/or the sending computing node's associated node communication manager module may take further actions in at least some embodiments and situations. For example, the particular provided virtual computer network may have a configured access mechanism for a particular remote resource service (e.g., a remote resource service provided via one or more of the computing systems 245*b* or via one or more computing systems at another data center 260) that is mapped to a particular namespace of that remote resource service, and the sending virtual machine computing node 207*a* may send the communication via that configured access mechanism. The configured access mechanism to that remote resource service for the particular provided computer network may be, for example, a virtual network address of the particular provided computer network that is assigned to represent that configured access mechanism, and if so that assigned virtual network address may be associated with the module 270 to cause the outgoing communication to be directed to the module 270. Before forwarding such an outgoing communication to the remote resource service via the public network 235, the module 270 may take various actions to reflect the configuration for the access mechanism used, such as to modify the outgoing communication to reference or otherwise use the particular namespace to which the access mechanism corresponds. In such situations, the module 270 may determine the namespace and other configuration information for the access mechanism in various ways, such as by storing the configuration information locally, contacting the system manager module 210 to obtain the configuration information, etc. In addition, the module 270 may determine how and when to modify communications to use the particular namespace in various manners, such as by the remote resource service having previously provided corresponding configuration information to the configurable network service (e.g., an indication of one or more particular message parameters that indicate a namespace; an indication of one or more particular message parameters used to name or reference resources, which may optionally include a namespace identifier; an indication of types of messages that allow a namespace to be indicated or that otherwise use namespace information; etc.).

As one particular illustrative example, the remote resource service may provide data storage services, and the outgoing communication may be a request to access a particular storage-related resource (e.g., to retrieve a stored object or other group of stored data). If so, the particular storage resource may have been previously created by the client as part of a namespace defined by the client, such as by using a computing system external to the provided computer network (e.g., on a remote private computer network of the client. By configuring the access mechanism for the particular provided computer network to use that same namespace, the computing nodes of the provided computer network may access and use existing stored resources of the client. As an illustrative example, if the remote private computer network of the client is a corporate network, the client may use different namespaces to store different types of data, such as to store sensitive human resources data in a first namespace, to store restricted software development software and other data in a second namespace, and to store other corporate data that is generally available throughout the corporation via a third namespace. If the provided computer network of the configurable network service is used by only a particular subset of the corporation (e.g., human resource personnel), the access mechanism to the remote resource service for the particular provided computer network may be configured to use the first namespace for the sensitive human resources data. Furthermore, the particular provided computer network may optionally have a second access mechanism configured to the remote resource service (e.g., using a different assigned virtual network address of the provided computer network), such as to use the third namespace for the generally available corporate data, so that the computing nodes of the particular provided computer network may interact with different local virtual network addresses of the particular provided computer network to obtain access to different groups of resources.

As another illustrative example, the access mechanism to the remote resource service for the particular provided computer network may instead be configured to allow only computing nodes of the particular provided computer network to have access to storage resources that are created and used by those computing nodes. If so, the configurable network service may determine a new namespace to use with the particular provided computer network, such as by automatically generating a new namespace (e.g., without providing that information to the computing nodes of the particular provided computer network) or by using a new namespace that is indicated by the client with the configuration information, and may configure the access mechanism to use the new namespace. The configurable network service or a computing node of the particular provided computer network may further need to take initial action to create the new namespace within the remote resource service, depending on the remote resource service. Once the new namespace is available, the computing nodes of the particular provided computer network may similarly use the configured access mechanism to interact with the remote resource service to create new stored resources that are part of the new namespace and to access such stored resources, and the external communication manager module 270 will similarly modify the outgoing communications as appropriate to use the new namespace.

In addition to or instead of being configured to implement a configured access mechanism corresponding to a particular namespace within a particular remote resource service, the external communication manager module 270 may in some embodiments be configured to include one or more additional indicators related to access control for some or all communications sent to that remote resource service via that access mechanism, and the sending virtual machine computing node 207*a* may send such a communication via that configured access mechanism. Before forwarding such an outgoing communication to the remote resource service via the public network 235, the module 270 may take various actions to reflect the configuration for the access mechanism used, such as to modify the outgoing communication to include the one or more additional indicators to which the access mechanism corresponds, such as by modifying the header and/or body of the communication in a manner specific to the remote resource service (e.g., if the remote resource service allows client specification of one or more access control indicators, to include the one or more additional indicators in a manner supported by the remote resource service, whether instead of or in addition to any indicators specified by the sending virtual machine computing nodes 207*a*). In such situations, the module 270 may determine the additional indicator(s) for the access mechanism in various ways, such as by storing the information locally, contacting the system manager module 210 to obtain the information, etc. In addition, the module 270 may determine how and when to modify communications to use the particular additional indicator(s) in various manners, such as by the remote resource service having previously provided corresponding configuration information to the configurable network service (e.g., an indication of one or more particular message parameters that indicate such access control indicators; an indication of one or more particular message parameters used to access resources, which may optionally include one or more such access control indicators; an indication of types of messages that allow one or more such access control indicators to be specified or that otherwise use such access control indicators; etc.).

In a manner similar to the examples previously discussed with respect to the use of namespace information with the configured access mechanism, the remote resource service may provide data storage services, and the outgoing communication may be a request to access a particular storage-related resource (e.g., to retrieve a stored object or other group of stored data). If so, the particular storage resource may have been previously created by one of the computing nodes of the provided computer network to which the sending virtual machine computing node 207*a* belongs, or may be being newly created or accessed as part of the current communication. In some embodiments, the configurable network service may further need to take initial action to specify the one or more additional indicators for use within the remote resource service (e.g., to define them), depending on the remote resource service. As discussed in greater detail elsewhere, the sending virtual machine computing node 207*a* and the associated client may be unaware of the use of the additional indicator(s), but the external communication manager module 270 will nonetheless modify the outgoing communications as appropriate to use the associated indicator(s).

Furthermore, as noted above, the external communication manager module 270 handles outgoing communications in the illustrated embodiment that are from provided computer network extensions to remote computer networks to which the extensions correspond, such as outgoing communications sent via a configured VPN connection to a particular remote computer network. In at least some embodiments, the configurable network service provides a remote access establishment API that allows a client to programmatically initiate the establishment of such a VPN connection from a location remote to the data center 200 to the computer network provided for the client at the data center 200, such as to cause appropriate hardware devices, software and/or configuration information to be delivered to the remote location for use by the client in establishing the VPN connection. For example, one of the computing systems 245*b* may correspond to an online retailer that sells or otherwise provides such hardware devices and/or software, and if so the configurable network service may use a separate API provided by the retailer to place an order for such hardware devices and/or software for delivery to the remote location or other designated location corresponding to the client (e.g., as specified by the client as part of invoking the provided API of the configurable network service, based on information previously stored by the configurable network service for the client, based on information previously stored by the retailer for the client, etc.). Once such a VPN connection or other secure connection is established to allow the client to have remote access to the provided computer network, the module 270 may further take actions to support the secure connection, such as by using the secure connection to send an outgoing communication that is intended for one or more destination computing systems at the remote location to which the secure connection corresponds.

Thus, as described above with respect to FIG. 2, in at least some embodiments, the configurable network service provides virtual computer networks to clients by implementing them as overlay networks using an underlying substrate network, such as using various node communication manager modules of the configurable network service and one or more external communication manager modules of the configurable network service. In at least some embodiments, one or more system manager modules may further facilitate configuring communications between computing nodes, such as by tracking and/or managing which computing nodes belong to which provided virtual networks, and by providing information about actual physical substrate network addresses that correspond to virtual network addresses used for a particular virtual network (e.g., by a particular customer or other entity). In addition, a system manager module may receive an indication of a virtual machine computing node on a target physical computing system and of a provided virtual network to which the virtual machine is to be associated, and then initiate configuration of a virtual machine node communication manager module for the target physical computing system so as to associate the virtual machine with the virtual network, or the node communication manager module may instead initiate that configuration (e.g., when the virtual machine first initiates or receives a communication).

In at least some embodiments, detection and/or prevention of unauthorized communications may be based at least in part on a topology of the one or more intermediate substrate networks on which a virtual network is overlaid, as previously noted. In such embodiments, the physical network address used for such a computing node for communications over the substrate network includes an indication of the computing node's virtual network address, and includes a partial network address for the substrate network that corresponds to a location of the computing node's associated node communication manager module (e.g., a sub-network or other portion of the substrate network for which the node communication manager module manages communications). Thus, in order for a malicious user to correctly construct a valid physical network address for a computing node that is part of a virtual network, the malicious user would need to gain access to information about the virtual network to which the computing node belongs, to gain access to information about the topology of the computing node's physical substrate network location in order to determine the partial network address for the associated node communication manager module, and to determine how to use that information to construct the physical network address. The validity of constructed physical network addresses may be checked in various ways, such as by identifying a computing node to which a virtual address embedded in a constructed physical network address corresponds, and verifying that a location of that identified computing node corresponds to one of the computing nodes in the portion of the substrate network that corresponds to the partial network address (e.g., one of the computing nodes managed by a node communication manager module to which the partial network address corresponds). In addition, the validity of constructed physical network addresses may be checked at various times, such as by a node communication manager module that receives an incoming communication intended for a destination computing node (e.g., to verify that the source physical network address is valid), by a manager module that receives a message purportedly from a node communication manager module on behalf of an indicated managed computing node (e.g., a message to request a physical network address for an intended destination computing node of interest), etc.

Figure 4A:
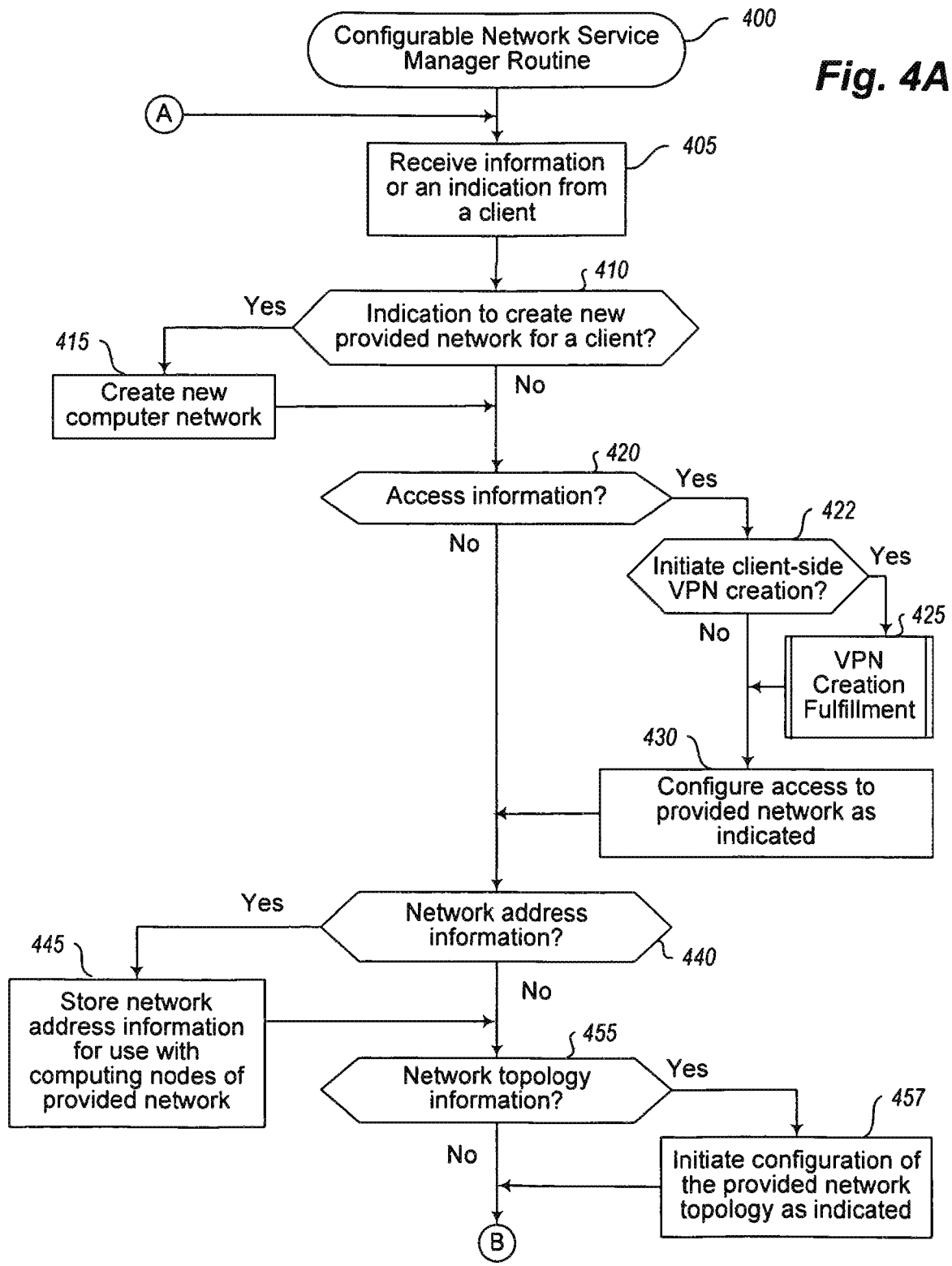
Figure 5:
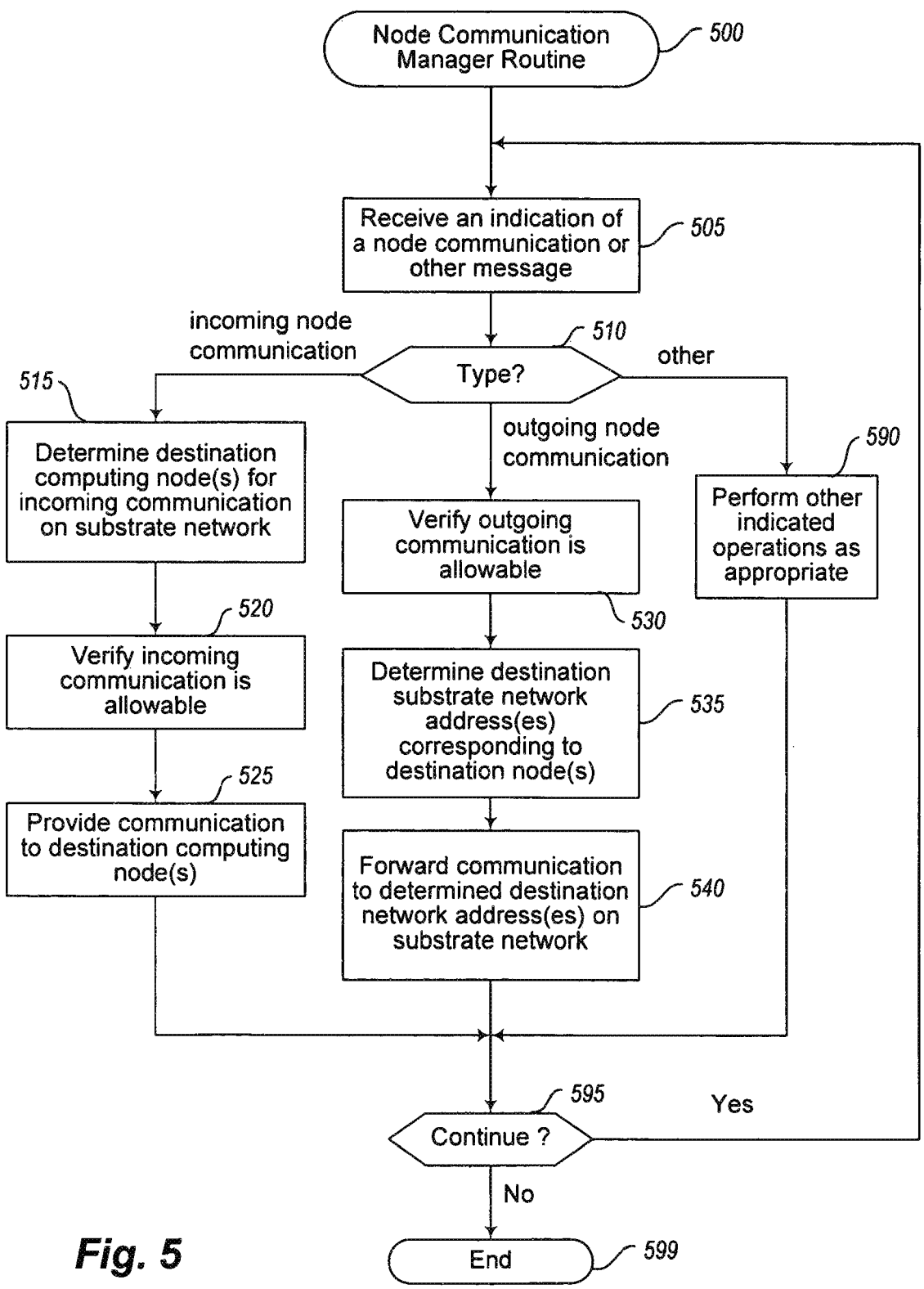
FIG. 5 illustrates a flow diagram of an example embodiment of a Node Communication Manager routine.
Figure 6:
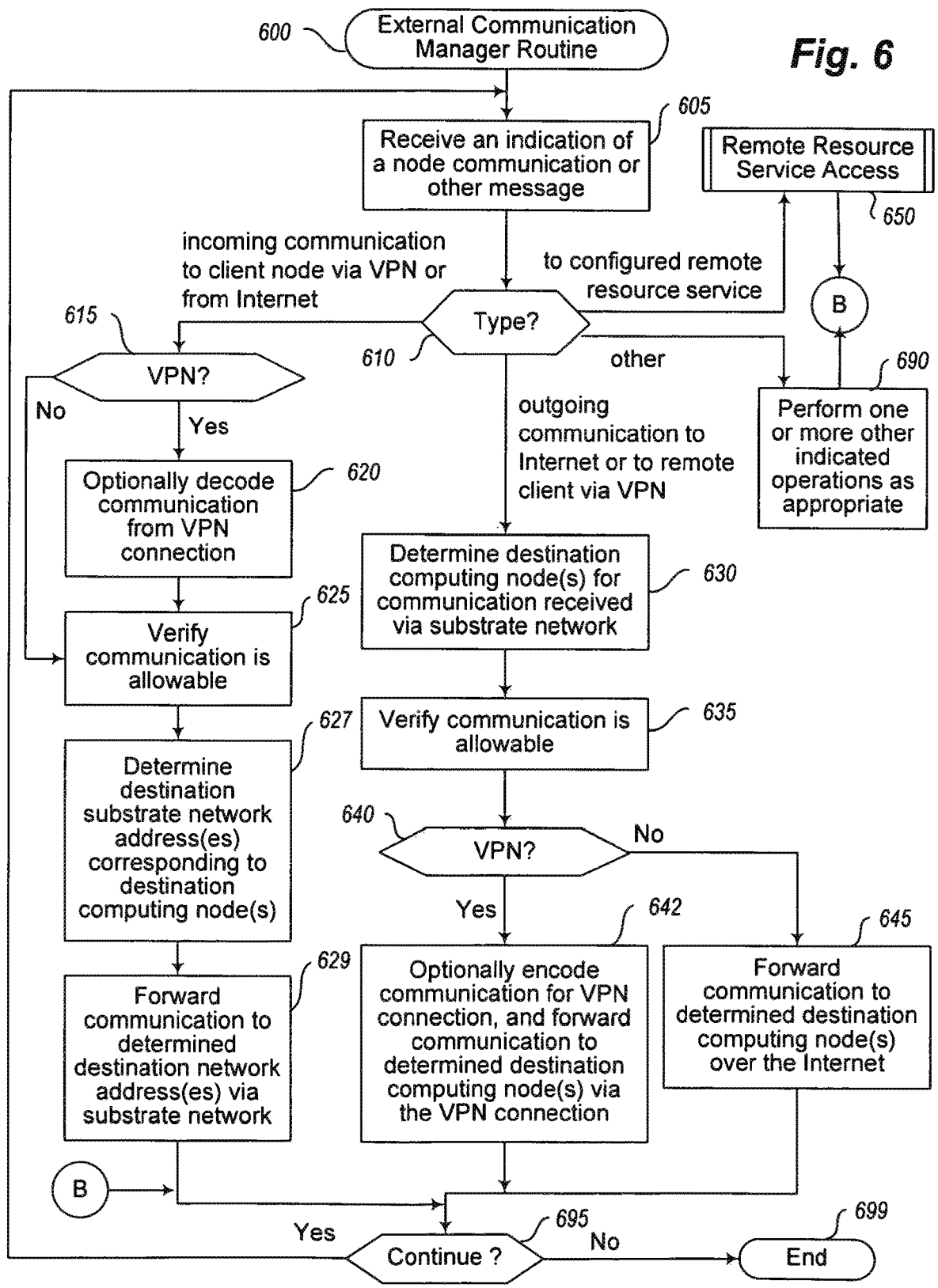
FIG. 6 illustrates a flow diagram of an example embodiment of an External Communication Manager routine.

FIGS. 4, 5 and 6 provide additional details related to actions of the system manager module 210, node communication manager modules, and external communication manager module 270, respectively, in at least some embodiments. Furthermore, additional details related to implementing overlay networks that may be used in at least some embodiments are included in U.S. application Ser. No. 12/060,074, filed Mar. 31, 2008 and entitled "Configuring Communications Between Computing Nodes;" which is incorporated herein by reference in its entirety.

Figure 3:
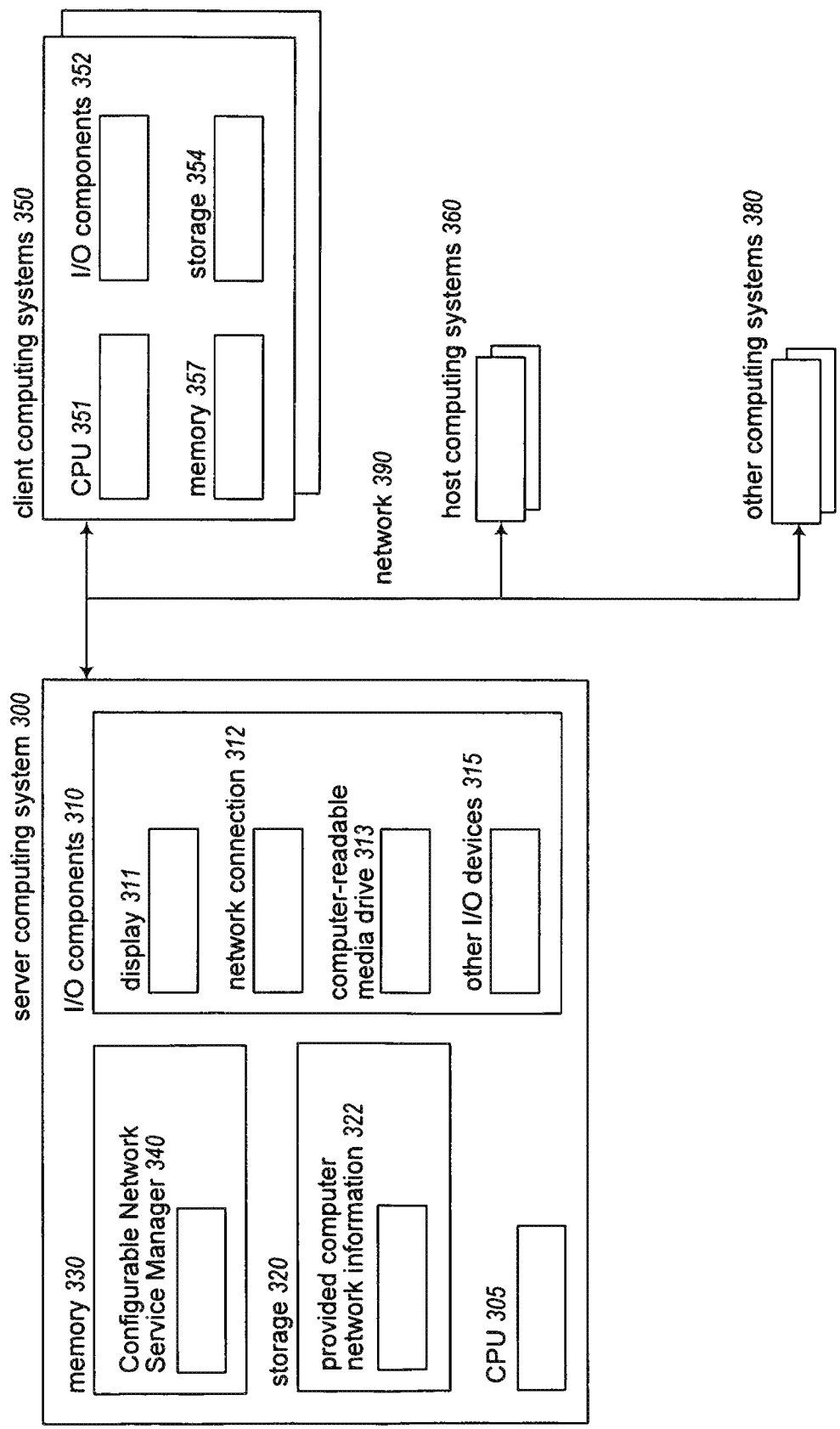
FIG. 3 is a block diagram illustrating example computing systems suitable for executing an embodiment of a system for providing computer networks for use by remote clients.

FIG. 3 is a block diagram illustrating example computing systems suitable for executing an embodiment of a system for providing computer networks for use by remote clients. In particular, FIG. 3 illustrates a server computing system 300 suitable for executing an embodiment of a configurable network service system manager module that assists in providing a configurable network service, as well as various client computing systems 350, host computing systems 360, and other computing systems 380. While not illustrated here, in some embodiments at least some of the illustrated computing systems may be co-located or otherwise associated (e.g., the server computing system 300 and at least some of the host computing systems 360 that are part of the configurable network service), such as at a data center, as described in greater detail with respect to FIGS. 1B and 2. In addition, while not illustrated here, various other modules of the configurable network service may be present and used in at least some embodiments, such as various node communication manager modules and one or more external communication manager modules.

In the illustrated embodiment, the server computing system 300 has components that include a CPU 305, various I/O components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated client computing systems 350 have components similar to those of server computing system 300, including a CPU 351, I/O components 352, storage 354, and memory 357. The other computing systems 360 and 380 may also each include similar components to some or all of the components illustrated with respect to server computing system 300, but such components are not illustrated in this example for the sake of brevity.

An embodiment of a Configurable Network Service ("CNS") Manager module 340 is executing in memory 330, and it interacts with computing systems 350, 360 and 380 over one or more networks 390 (e.g., via the Internet and/or the World Wide Web, via a private cellular network, via a private substrate network in use by the configurable network service, etc.). In this example embodiment, the module 340 includes functionality related to providing and managing computer networks for use by various clients (not shown) as part of a configurable network service, with the clients using computing systems 350 to configure and access the provided computer networks. The host computing systems 360 may also assist in providing the configurable network service, such as by providing computing nodes for the computer networks provided by the configurable network service. Similarly, in at least some embodiments, at least some of the other computing system 380 may also assist in providing the configurable network service, such as by facilitating intercommunications between provided computer networks and external remote computing systems (e.g., by implementing VPN connections or other access mechanisms), by providing remote resource services that the provided computer networks are configured to access, by facilitating intercommunications between computing nodes of provided computer networks (e.g., by implementing portions of a substrate network or other infrastructure of the configurable network service that facilitates the communications), etc.

The other computing systems 350, 360 and 380 may be executing various software as part of interactions with the module 340. For example, some or all of the client computing systems 350 may each be executing software in memory 357 to interact with module 340 (e.g., as part of a Web browser or specialized client-side application program), such as to enable a user of a client computing system to create and configure a computer network for use by the user or other client of the configurable network service. Furthermore, some or all of the client computing systems 350 and/or other computing systems 380 may each be executing software in memory 357 to interact on behalf of a client with a computer network being provided by the configurable network service for the client, such as via a VPN connection that connects multiple of the client computing systems 350 and/or other computing systems 380 that are part of a remote network for a client to multiple of the host computing systems 360 that provide computing nodes as part of a provided computer network extension for the client's remote network. In addition, one or more users of the client computing systems 350 may interact with module 340 to perform various other types of actions (e.g., administrative functions related to accounts of clients with the configurable network service, to monitor use of provided computer networks, etc.), as discussed in greater detail elsewhere. Furthermore, some of the host computing systems 360 and/or the other computing systems 380 may execute software modules (not shown) to assist in providing the configurable network service, such as node communication manager modules that assist in managing communications sent to and from computing nodes of provided computer networks. In addition, other of the computing systems 360 and 380 may perform other functions, such as to execute remote resource services available to various users. Various information related to the functionality of module 340 and the configurable network service may also be stored in storage 320, such as information 322, and may include information related to configuration and/or provision of computer networks on behalf of multiple clients.

After the module 340 receives one or more requests (or other indications) to create and configure a computer network for a client, the module 340 may perform various actions as discussed in greater detail elsewhere. Such actions may including selecting one or more computing nodes from the host computing systems 360 that will be part of the computer network, configuring those host computing systems and/or other computing systems to provide that computer network, and initiating access of the provided computer network to remote computing systems 350 or remote other computing systems 380 of a client. In addition, the module 340 may further interact with computing systems 360 to manage computer networks being provided, such as in response to requests from clients or instead as automatically determined, including in some situations to increase or decrease the quantity of computing nodes that are part of a provided computer network, to modify configured network topology for a provided computer network, to modify particular host computing systems that provide computing nodes of the provided computer network (e.g., by migrating programs executing on one or more computing nodes of a provided computer network to other computing nodes), etc. In addition, the module 340 may monitor or otherwise interact with one or more of the host computing systems 360 to track use and operation of the provided computer networks.

It will be appreciated that computing systems 300, 350, 360 and 380 are merely illustrative and are not intended to limit the scope of the present invention. The computing systems and/or computing nodes may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system may comprise any combination of hardware or software that may interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated module 340 may in some embodiments be distributed in additional modules, or the module 340 may incorporate functionality described elsewhere as being provided by multiple modules of the configurable network service (e.g., one or more system manager modules, one or more node communication manager modules, and one or more external communication manager modules). Similarly, in some embodiments, some of the functionality of the module 340 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

FIGS. 4A and 4B illustrate a flow diagram of an example embodiment of a Configurable Network Service Manager routine 400. The routine may be provided by, for example, execution of the system manager module 110 of FIG. 1A, the system manager module 210 of FIG. 2, and/or the system manager module 340 of FIG. 3, such as to assist in managing operations of a configurable network service that provides computer networks to remote clients. In the illustrated embodiment, at least some of the computer networks that are created and provided by the routine 400 may be extensions to existing remote networks of clients, while in other embodiments the networks that are created and provided by the routine 400 may instead be standalone networks for use by clients that are not extensions of other networks.

The illustrated embodiment of the routine begins at block 405, where an indication is received of a message from a client or other information that is received. In at least some embodiments, the configurable network service that the routine 400 supports provides one or more APIs to allow remote clients to programmatically interact with the configurable network service, and if so some or all of the indications received in block 405 may be made via invocations or other programmatic interactions of remote clients with those APIs, while in other embodiments and situations, some or of the indications received in block 405 may instead be initiated by remote clients or others in other manners.

After block 405, the routine continues to block 410 to determine whether the indication received in block 405 is to initiate the creation of a new computer network to be provided on behalf of a requesting client, such as an extension to an existing remote network of the client. If so, the routine continues to block 415 to perform various actions to create the new computer network extension or other new computer network on behalf of the client. For example, as described in greater detail elsewhere, the received communication to create the new computer network may include various configuration information related to the computer network to be created, such as a number of computing nodes that are to be part of the created computer network, an indication of whether the new computer network is an extension to another remote network, etc. The actions taken in block 415 may include, for example, selecting particular computing nodes that are available from the configurable network service for use in the new computer network that is being created; generating and associating a unique identifier with the new computer network that is being created; storing any received configuration information for later use; etc. As described in greater detail elsewhere, such computing nodes may be selected from a group of available computing nodes in various manners in various embodiments, such as based on capabilities of the selected computing nodes, based on network locations of the selected computing nodes (e.g., on an underlying substrate network of the configurable network service, on a relative network location to other computing nodes of the computer network, etc.), based on geographic locations of the selected computing nodes (e.g., in one of multiple geographically distributed data centers, on a relative geographic location to other computing nodes of the computer network, etc.), in a random manner, etc. Furthermore, while not illustrated here, the routine may provide to the client the unique identifier for the new computer network or other reference for the new computer network, so as to allow the client to later reference the new computer network when performing further configuration of the new computer network.

After block 415, or if it is instead determined in block 410 that the indication received in block 405 is not to create a new computer network, the routine continues to block 420 to determine whether the indication received in block 405 includes information related to access constraints or other access information for an indicated computer network. For example, in some situations, a client may supply one or more requests or other messages that are received and processed together with respect to block 405, such as a request to create a new computer network extension and various specified configuration information for that new computer network extension—if so, the indicated computer network for which access information is supplied may be the new computer network extension that was just created with respect to block 415. In other situations and embodiments, a remote client may instead supply different communications at different times that are received and processed with respect to block 405, such as an initial request to create a new computer network, and later one or more other separate requests to specify various types of configuration information for that previously created computer network. If it is determined in block 420 that access information is received in block 405, the routine continues to block 422 to determine whether the client has invoked a remote access establishment API or otherwise requested that remote access be established from a remote location of the client to the indicated computer network, which in the illustrated embodiment is performed by initiating the creation of a VPN connection to the indicated computer network from one or more remote computing systems of the client at the remote location. If so, the routine continues to block 425 to execute a VPN Creation Fulfillment routine to take actions to establish the remote client access, with one example of such a routine being described in greater detail with respect to FIG. 8.

After block 425, or if it is instead determined in block 422 that the access information does not indicate to initiate the creation of an VPN connection at a remote client location, the routine continues to block 430 to use other specified access constraint information for the indicated computer network to configure allowable access for the indicated computer network. As described in greater elsewhere, such configuration information may include constraints as to whether any of the computing nodes of the computer network are allowed to have access to the Internet or otherwise outside the computer network, as well as to optionally specify communication access policies between computing nodes of the computer network (including remote parts of the computer network if the indicated computer network is an extension to a remote computer network). Accordingly, in block 430, the routine takes one or more actions that may include, for example, configuring routing information to be used by node communication manager modules and/or external communication manager modules that support the computer network (e.g., by sending a message to those communication manager modules with the information to be configured), as described in greater detail elsewhere. Furthermore, if actions were taken in block 425 to establish a VPN connection from a remote client location to the provided computer network, the actions taken in block 430 may further include taking actions to support such a VPN connection by the provided computer network or otherwise by the configurable network service on behalf of the provided computer network, such as by configuring the provided computer network to accept such a VPN connection and to use appropriate information to decrypt communications that are encrypted for the VPN connection.

After block 430, or if it instead determined in block 420 that the indication in block 405 does not include access information, the routine continues to block 440 to determine whether the indication in block 405 includes network address information for an indicated computer network, such as one or more network address ranges and/or network addresses specified in another form. If so, the routine continues to block 445 to store the specified network address information for use with the computing nodes of the indicated computer network, and may further proceed to associate those specified network addresses with the computing nodes of the indicated computer network if those computing nodes have already been selected or otherwise put into use, such as with respect to blocks 415 and/or 462. The associating of specified network addresses with computing nodes of a computer network may further include configuring routing information to be used by node communication manager modules and/or external communication manager modules that support the computer network, as described in greater detail elsewhere. After block 445, or if it is instead determined in block 440 that the indication received in block 405 did not include network address information, the routine continues to block 455 to determine whether the indication received in block 405 includes network topology information for an indicated computer network. If so, the routine continues to block 457 to store the network topology information for the indicated computer network, and to optionally proceed to configure that indicated computer network in accordance with the network topology information. The configuring of network topology information may include configuring routing information to be used by node communication manager modules and/or external communication manager modules that support the computer network, such as to simulate actions of virtual networking devices that are part of the specified topology information, as described in greater detail elsewhere.

After block 457, or if it instead determined in block 455 that the indication in block 405 does not include network topology information, the routine continues to block 460 to determine whether the indication in block 405 includes an indication to add computing nodes to an indicated computer network, such as if the indicated computer network has been configured to include a specified quantity of computing nodes but less than that specified quantity have been selected and put into use. Furthermore, in some embodiments, a client may modify an existing computer network being provided by the configurable network service in various manners even after use of the computer network has been ongoing, including to modify the quantity of computing nodes of the computer network and/or to modify that network topology information for the computer network, as discussed in greater detail elsewhere. If it is determined in block 460 that the indication is to add one or more computing nodes, the routine continues to block 462 to select one or more computing nodes to be added to the indicated computer network from a group of available computing nodes of the configurable network service. As described in greater detail elsewhere, such computing nodes may be selected in various manners. In block 464, the selected computing nodes are then added to the computer network, such as in a manner similar to that previously discussed (e.g., by associating appropriate network address information with those selected computing nodes, by setting access rights for those selected computing nodes in accordance with any specified network topology information and/or other access constraint information for the computer network extension, etc.).

After block 464, or if it is instead determined in block 460 that the indication in block 405 is not to add computing nodes, the routine continues to block 470 to determine whether the indication in block 405 is to add configured access for an indicated computer network to an indicated remote resource service. If so, the routine continues to block 475 to configure an access mechanism for the indicated computer network to access the indicated remote resource service, such as by mapping one or more network addresses for the indicated computer network to that remote resource service, by configuring routing information to be used by node communication manager modules and/or external communication manager modules that support the computer network, by configuring actions to be taken by external communication manager modules for communications that use the access mechanism, etc. The routine then continues to block 478 to determine whether the remote resource service has a particular namespace for the resources that are to be accessible from the indicated computer network and/or has one or more additional access control indicators for the indicated computer network for use with the resources, such as may be indicated in block 405 or otherwise automatically determined by the configurable network service, and if so the routine continues to block 480 to associate that namespace information and/or the access control indicator information with the configured access mechanism for the remote resource service.

After block 480, or if it is instead determined in block 478 that a namespace and/or additional access control indicators are not to be used or in block 470 that the indication in block 405 is not to provide access to an indicated remote resource service, the routine continues to block 490 to optionally perform one or more other indicated operations as appropriate. For example, after completing the configuration of a particular computer network for a client, the routine may further take one or more final steps to provide access to the computer network from remote sources, such as from a remote computer network to which a created new computer network extension belongs. Such providing of access may include, for example, providing information to the client to enable the client to access the computer network (e.g., a publicly accessible network address for a VPN to the computer network), configuring the computer network to accept communications from the remote client, etc. In addition, the routine may further perform other operations at times (e.g., periodically, when current conditions exceed a specified threshold or otherwise trigger a specified condition, etc.), such as to ping or otherwise check the status of some or all computing nodes for some or all computer networks, monitor the use of some or all computer networks by remote clients, monitor the use of internal configurable network service resources by some or all provided computer networks, establish and maintain accounts of clients with the configurable network service, respond to requests from clients for status information about their accounts or about their provided computer networks, obtain payment from clients for use of the configurable network service, reduce a quantity of computing nodes for an indicated computer network, modify the particular computing nodes that are part of an indicated computer network (e.g., by moving one or more executing programs from a computing node at a first geographical location to a new computing node at a second geographical location), etc. After block 490, the routine continues to block 495 to determine whether to continue, such as until an explicit indication to terminate is received. If it is determined to continue, the routine returns to block 405, and if not continues to block 499 and ends.

FIG. 5 is a flow diagram of an example embodiment of a Node Communication Manager routine 500. The routine may be provided by, for example, execution of the CNS node communication manager modules 209a, 209d, and 250 of FIG. 2, such as to control communications to and from associated computing nodes of provided computer networks in at least some embodiments. The routine 500 may, in at least some embodiments, be executed by each of a number of node communication manager modules of the configurable network service that are each associated with one or more of the computing nodes provided by the configurable network service, and each of the node communication manager modules may be provided in various manners (e.g., as part of a virtual machine monitor hypervisor for a physical host computing system on which other virtual machine computing nodes execute, as a standalone proxy computing system or other computing system that controls communications to and from one or more computing nodes of provided computer networks, etc.). In particular, in the illustrated embodiment, the node communication manager modules facilitate the providing of computer networks for clients by using virtual networks that are overlaid on one or more underlying physical substrate networks used by the configurable network service to interconnect the various computing nodes of the configurable network service, although in other embodiments the provided computer networks may have forms other than virtual networks and/or overlay networks. Furthermore, as described in greater detail elsewhere, the node communication manager modules in the illustrated embodiment provide functionality in accordance with specified network topology information for provided computer networks, such as by implementing the functionality of simulated virtual or phantom networking devices or otherwise handling communications in a manner consistent with such networking devices being present, although in other embodiments the network topology information for a provided computer network may instead be provided in other manners (e.g., by using actual physical networking devices that correspond to the network topology).

The illustrated embodiment of the routine begins at block 505, where an indication is received of a node communication or other message. The routine continues to block 510 to determine the type of indicated message and to proceed accordingly. In particular, if the indicated message is determined to be an incoming node communication intended for one or more destination computing nodes associated with the communication manager module to which the routine corresponds, the routine continues to block 515 to determine the one or more intended destination computing node(s) for the incoming node communication. For example, the incoming communication may be directed to a node communication manager module over one or more underlying substrate networks, and the header or other portion of the communication sent via the substrate network may include information about a virtual network address of a destination computing node that is part of a virtual provided computer network, or may otherwise indicate the destination computing node. As discussed below with respect to block 525, the handling of the incoming communication via the substrate network may further include modifying the communication in a manner appropriate for the provided computer network to which the destination computing node belongs, such as by re-headering the communication to use virtual network addresses for the destination and source computing nodes.

After block 515, the routine continues to block 520 to verify that the incoming communication is allowable for the intended destination computing node(s). As discussed in greater detail elsewhere, the incoming communications may be determined to be allowable or unallowable in various manners, such as to provide firewall capabilities or other access control so that only communications from specified other computing nodes are allowed (e.g., other computing nodes that are part of the same provided computer network) and/or so that only specified types of communications are allowed (e.g., for at least some communications from other computing systems, only if the communications are responses to other communications that were sent to those computing systems from one of the computing nodes of a provided computer network). As previously noted, the determination of whether the communication is allowable may be made based at least in part on configuration information that was previously specified for the node communication manager module to which the routine corresponds, such as in a manner specific to the destination computing node(s) and/or the provided computer network to which those destination computing node(s) belong (e.g., based on the specified network topology information for the provided computer network to which the destination computing node(s) belong and/or other access constraint information specified for that provided computer network). In addition, in embodiments in which an overlay virtual network is used for the provided computer network to which the destination computing node(s) belong, the verifying of the incoming communication may be based in part on information about the overlay network and/or about the substrate network that is included in the incoming communication by the configurable network service after the communication is sent by the initial sending computing node, such as to verify that the communication was actually sent by the purported sender.

If it is determined that the incoming communication is allowable, the incoming communication is provided in block 525 to the one or more destination node(s) for the communication, such as by forwarding the communication over one or more connections or communication links between the node communication manager module and the destination computing node(s). In embodiments in which the incoming communication was sent via an underlying substrate network, the incoming communication may first be modified so that it is consistent with the provided computer network, such as by re-headering the incoming communication in a manner consistent with the provided computer network (e.g., to use virtual network addresses corresponding to the provided computer network for the destination and source computing nodes). In addition, while not illustrated here, if the communication is not determined to be allowable in block 520, the routine may take various other actions, such as to drop the outgoing node communication without any indication to the sending computing node, return an error message to the sending computing node, attempt to modify the outgoing communication to be allowable, etc.

If it is instead determined in block 510 that the indicated message in block 505 is an outgoing node communication from an associated computing node of a provided computer network that is managed by the node communication manager module to which the routine corresponds, the routine continues instead to block 530 to first verify whether the outgoing communication is allowable, such as in a manner similar to that previously described with respect to block 520. As discussed in greater detail elsewhere, the determination of whether the outgoing communication is allowable may be made in various manners in various embodiments, including based on the specified network topology information for the provided computer network to which the sending computing node belongs and/or other access constraint information specified for that provided computer network. In the illustrated embodiment, the provided computer networks are virtual overlay networks, and the communications between computing nodes are actually sent via one or more underlying substrate networks. Accordingly, after block 530, the routine continues to block 535 to determine one or more substrate destination network addresses that correspond to the one or more destination computing nodes or other destination computing systems for the outgoing communication (e.g., to one or more remote node communication manager modules that manage communications for those destination computing nodes, to an external communication manager module that manages communications for external destination computing systems, etc.), as described in greater detail elsewhere. The routine then continues to block 540 to forward the outgoing node communication to the intended destination(s) by using the determined substrate destination network address(es). In a manner similar to that described with respect to block 525, the forwarding of the node communication via the underlying substrate network may include modifying the outgoing communication so that it is consistent with the substrate network, such as by re-headering the outgoing communication in a manner consistent with the substrate network (e.g., to use the determined substrate destination network addresses and/or to include information about the virtual network addresses for the destination and source computing nodes), as described in greater detail elsewhere.

If it is instead determined in block 510 that another type of indicated message was received in block 505, the routine continues instead to block 590 to perform one or more other indicated operations as appropriate. For example, other types of messages may include configuration information or other administrative messages from the configurable network service manager routine 400 of FIG. 4 (e.g., to specify routing information or other configuration information to be used by the routine 500 for one or more provided computer networks to which this instance of the routine 500 corresponds), from other node communication manager routines (e.g., to propagate configuration information for provided computer networks), etc. Similarly, in some situations the routine may in block 590 take actions to send configuration information for provided computer networks to other node communication manager modules, such as to distribute such information in a peer-to-peer manner after receiving the information from another node communication manager module or from the configurable network service manager module. Other actions may include various types of administrative or housekeeping actions in at least some embodiments and situations, such as to check the status of some or all computing nodes for some or all computer networks, monitor the use of some or all computer networks by remote clients, monitor the use of internal configurable network service resources by some or all provided computer networks, etc. After blocks 525, 540, or 590, the routine continues to block 595 to determine whether to continue, such as until an explicit indication to terminate is received. If it is determined to continue, the routine returns to block 505, and if not continues to block 599 and ends.

Thus, the routine 500 manages a variety of types of communications to and from computing nodes that are part of computer networks provided by the configurable network service. While not separately illustrated in this example embodiment of the routine, it will be appreciated that the routine 500 may further perform configurations for at least some communications to allow one or more responses to previously sent communications, such as to initiate a session or other series of communications. Thus, for example, a particular computing node of a provided computer network may be configured to not accept communications from at least some other computing systems (e.g., external computing systems), but may allow communications from those other computing systems if they are responses to communications initially sent from that particular computing node. Accordingly, the determination in block 520 may further be based in part on whether the incoming communication is a response to a previous outgoing communication that was handled with respect to blocks 530-540.

FIG. 6 illustrates a flow diagram of an example embodiment of an External Communication Manager routine 600. The routine may be provided by, for example, execution of the external communication manager module 270 of FIG. 2, such as to manage communications that pass into or out of a data center or other group of computing nodes controlled by the configurable network service (e.g., between that group of controlled computing nodes and other computing systems that are at locations external to those controlled computing nodes, such as remote locations of clients, remote resource services, and other places generally accessible on the Internet or other public networks). As described in greater detail elsewhere, the one or more external communication manager modules in the illustrated embodiment provide functionality in accordance with specified access constraint information for provided computer networks and in accordance with specified configuration information for accessing particular remote resource services, such as by handling communications in a manner consistent with firewalls and other accessibility information specified by clients for their provided computer networks and/or specified by the configurable network service for its provided computer networks. In addition, in the illustrated embodiment, the computer networks that are provided by the configurable network service are virtual overlay networks that use one or more underlying physical substrate networks that interconnect the computing nodes provided by the configurable network service, although in other embodiments the provided computer networks may be implemented in other manners (e.g., without using virtual networks and/or overlay networks).

The illustrated embodiment of the routine begins in block 605, where an indication is received of a communication to or from a computing node of a provided computer network or of another message. After block 605, the routine in block 610 determines the type of indicated message that is received, and proceeds accordingly. In particular, if the indicated message is incoming to the computing nodes controlled by the configurable network service and is intended for one or more destination computing nodes on a provided computer network (e.g., via a VPN connection from a remote location of the client on whose behalf the computer network is provided, from an external computing system via the Internet, etc.), the routine continues to block 612. In block 615, the routine first determines whether the incoming communication was sent via a client's VPN connection, and if so continues to block 620 to optionally decrypt or otherwise decode the communication (e.g., if other software of the configurable network service has not already handled such management of communications received via the VPN connection). In other embodiments, blocks 615 and 620 may not be performed, such as if other software and/or hardware of the configurable network service manages such communications received via a VPN connection before they are received in block 605. After block 620, or if it is instead determined in block 615 that the incoming communication is not received via a VPN connection, the routine continues to block 625.

Blocks 625-629 are performed in a manner similar to those of blocks 530-540 of FIG. 5. In particular, in block 625, the routine first verifies whether the incoming communication is allowable, such as based at least in part on specified network typology information for the provided computer network to which the destination computing node(s) belong and/or based on other access constraint information for that provided computer network. If the communication is verified to be allowable, the routine continues to block 627 to determine one or more destination substrate network addresses that correspond to the destination computing node(s). In block 629, the routine then forwards the communication to the determined destination network addresses on the substrate network, such as to eventually be handled by one or more node communication manager modules as previously described with respect to blocks 515-525 of FIG. 5. As previously noted, if the communication is not verified to be allowed in block 625, various other actions may instead be taken, such as to drop the communication. In addition, the forwarding of the communication on the substrate network may include modifying the communication in one or more manners to be consistent with the substrate network, as discussed in greater detail elsewhere. Furthermore, while not illustrated here, in at least some embodiments, the routine may perform other functionality consistent with communications incoming to a group of controlled computing nodes (e.g., from a public network to a private network), such as functionality to provide network address translation ("NAT") and/or port address translation ("PAT"), to provide general firewall or proxy or other security functionality for the configurable network service, etc.

If it is instead determined in block 610 that the indicated message is not an incoming communication to a computing node of a provided computer network, but is instead a communication that is received over the internal substrate network from a computing node of a provided computer network and is outgoing to one or more external destination computing systems (e.g., via a VPN connection to a remote computer network of a client or other remote computing system of a client, over the Internet to a publicly accessible system, etc.), the routine continues to block 630. Blocks 630, 635, and 645 are performed in a manner similar to blocks 515-525 of FIG. 5. In particular, in block 630, the routine determines one or more intended destination computing systems at one or more remote locations for the outgoing communication, such as based on information in the communication received via the substrate network. In block 635, the routine then verifies whether the communication is allowable, such as in a manner similar to that previously described (e.g., by considering specified network topology information and/or access constraint information for the provided computer network to which the sending computing node belongs). After block 635, the routine continues to block 640 to determine whether the outgoing communication is being sent via a VPN connection to one or more remote client computing systems, such as part of a remote computer network of the client. If so, the routine continues to block 642 to optionally encrypt or otherwise encode the communication for the VPN connection (e.g., if other software and/or hardware of the configurable network service does not handle such management of communications sent via the VPN connection), and then forwards the communication to the determined destination computing systems via the VPN connection. In other embodiments, separate software and/or hardware that maintains the VPN connection will instead perform such operations. If it is instead determined in block 640 that the outgoing communication is not being sent via a VPN connection, the routine continues instead to block 645 to forward the communication to the determined destination computing systems over the Internet or other public networks. As previously described, the routine may further modify such outgoing communications that are received via the substrate network before they are forwarded externally, such as to re-header the outgoing communication in a manner consistent with the computer networks over which the communication will travel. Furthermore, while not illustrated here, in at least some embodiments, the routine may perform other functionality consistent with communications outgoing from a group of controlled computing nodes (e.g., from a private network to a public network), such as functionality to provide network address translation ("NAT") and/or port address translation ("PAT"), to provide general firewall or proxy or other security functionality for the configurable network service, etc.

Figure 7:
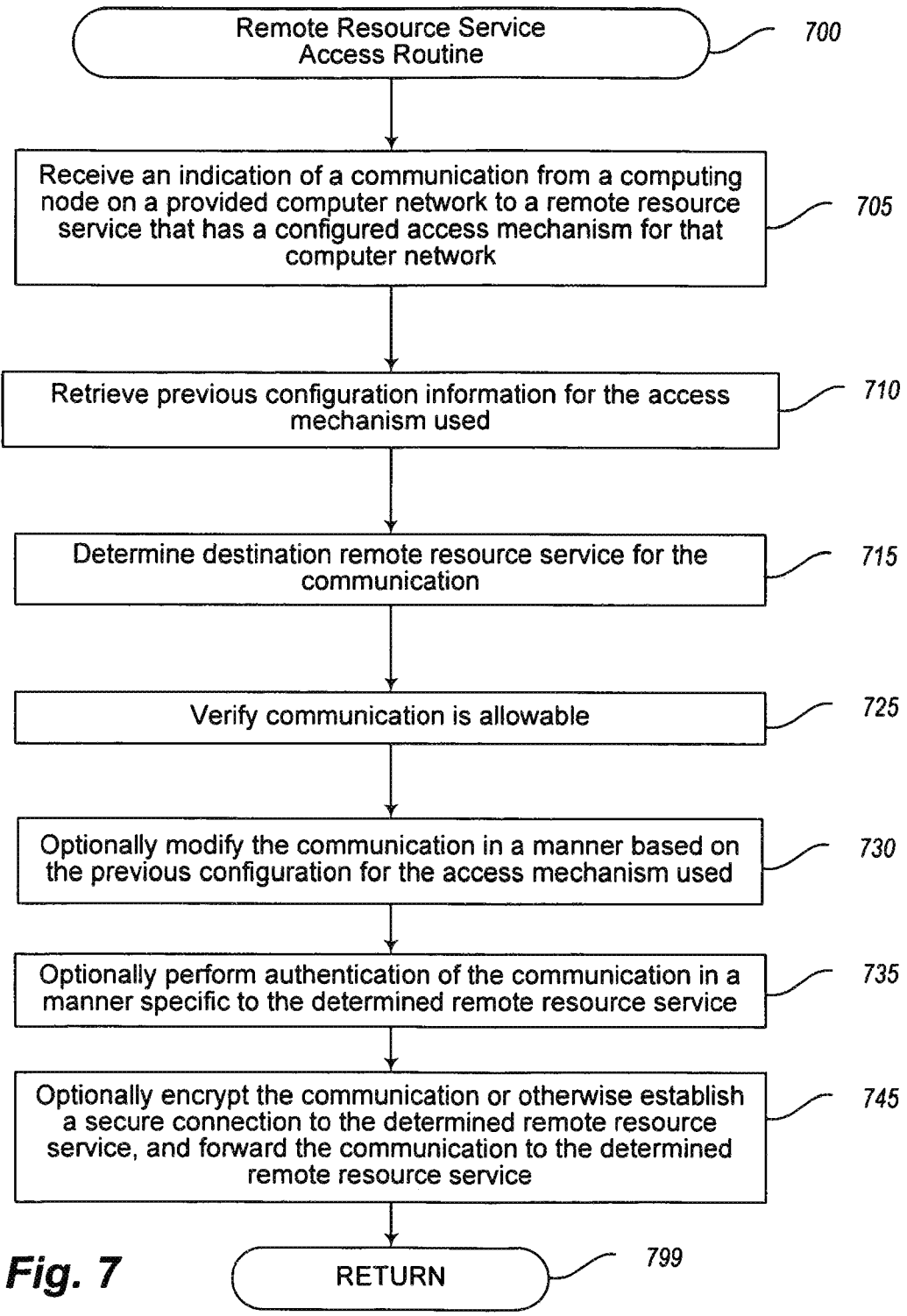
FIG. 7 illustrates a flow diagram of an example embodiment of a Remote Resource Service Access routine.

If it instead determined in block 610 that the indicated message is from a computing node on a provided computer network to access a remote resource service that has a configured access mechanism for that provided computer network, the routine continues instead to block 650 to execute the Remote Resource Service Access routine, with one example embodiment of that routine described in greater detail with respect to FIG. 7. Otherwise, the routine continues to 690 to perform one or more other indicated operations as appropriate, such as in response to other received messages or received information. Such other indicated operations may have various forms, such as discussed in greater detail with respect to block 590 of FIG. 5. For example, other types of messages may include configuration information or other administrative messages from the configurable network service manager routine 400 of FIG. 4 (e.g., to specify routing information or other configuration information to be used by the routine 600 for one or more provided computer networks), from node communication manager routines (e.g., to propagate configuration information for provided computer networks), etc. Similarly, in some situations the routine may in block 690 take actions to send configuration information for provided computer networks to node communication manager modules, such as to distribute such information in a peer-to-peer manner after receiving the information from other node communication manager modules or from the configurable network service manager module. Other actions may similarly include various types of administrative or housekeeping actions in at least some embodiments and situations, such as to check the status of some or all computing nodes for some or all computer networks, monitor the use of some or all computer networks by remote clients, monitor the use of internal configurable network service resources by some or all provided computer networks, etc.

After blocks 629, 642, 645, 650, or 690, the routine continues to block 695 to determine whether to continue, such as until an explicit indication to terminate is received. If it is determined to continue, the routine returns to block 605, and otherwise continues to block 699 and ends.

Thus, the routine 600 manages a variety of types of communications to and from computing nodes that are part of computer networks provided by the configurable network service. While not separately illustrated in this example embodiment of the routine, it will be appreciated that the routine 600 may further perform configurations for at least some communications to allow one or more responses to previously sent communications, such as to initiate a session or other series of communications. Thus, for example, a particular provided computer network may be configured to prevent any external computing systems from initiating communications to computing nodes of that computer network, but may allow such an external computing system to respond to a communication that is initially sent from a computing node of that computer network to that external computing system. Accordingly, the determination in block 625 may further be based in part on whether the incoming communication is a response to a previous outgoing communication that was handled with respect to blocks 630-645. Similarly, for communications that are initiated to access remote resource services, as discussed in greater detail with respect to block 650, responses from the remote resource services may be configured to be allowed, such as with respect to blocks 615-629, or instead in another manner.

FIG. 7 is a flow diagram of an example embodiment of a Remote Resource Service Access routine 700. The routine may be provided by, for example, execution of the external communication manager module 270 of FIG. 2, such as may be initiated by execution of block 650 of FIG. 6. The routine manages communications made by computing nodes of provided computer networks to remote resource services, and in particular to remote resource services to which the provided computer networks have previously been configured to provide specialized access, such as in conjunction with blocks 475-480 of FIG. 4. As discussed in greater detail elsewhere, in at least some embodiments, a provided computer network may be configured to provide specialized access to a particular remote resource service (e.g., by assigning one or more network addresses on that provided computer network to represent the remote resource service), and a substrate physical network may be configured to forward corresponding communications to an external communication manager module that manages external communications, with the external communication manager module being configured to manage those forwarded communications as appropriate.

In the illustrated embodiment, the routine begins at block 705, where an indication is received of a communication from a computing node on a provided computer network to a remote resource service for which a configured access mechanism is provided for that computer network, such as based on the network address used for the communication. The routine then continues to block 710, where it retrieves configuration information that was previously specified for the access mechanism used for the communication. In block 715, the routine then determines the destination remote resource service for which the communication is intended, such as based on the retrieved configuration information.

After block 715, the routine continues to block 725 to determine whether the communication is allowable, such as in a manner similar to that discussed with respect to blocks 520 and 530 of FIG. 5 and blocks 625 and 635 of FIG. 6. Furthermore, the determination may further be made in at least some situations and embodiments based on the retrieved configuration information for the access mechanism used, such as to only allow certain types of communications for certain configured access mechanisms. If the communication is determined to be allowable, the routine then continues to block 730 to optionally modify the communication in a manner based on the previous configuration for the access mechanism used. For example, as discussed in greater detail elsewhere, an access mechanism may be configured to modify communications to correspond to a particular namespace used by a remote resource service, to include information about the provided computer network of the computing node that send the communication or other information about the location of the computing node for authentication purposes by the remote resource service, etc.

The routine then continues to block 735 to optionally perform additional authentication-related activities for the communication in a manner specific to the determined remote resource service. For example, as discussed in greater detail elsewhere, at least some remote resource services may be affiliated with the configurable network service or otherwise allow the configurable network service to access the remote resource service in a privileged manner that is not provided to unauthenticated requesters communicating with the remote resource service over public networks. If so, the routine may perform authentication-related activities that, for example, enable the remote resource service to determine that the communication is being sent from a trusted or otherwise known requester, such as by modifying the communication to include an identifier that corresponds to the configurable network service (e.g., based on prior interactions between the configurable network service and the remote resource service, such as by including a digital signature based on the identifier as part of the modified communication).

After block 735, the routine then continues to block 745 to optionally encrypt the communication or otherwise access a secure connection to the determined remote resource service (e.g., a VPN connection with a particular affiliated remote resource service, a dedicated private lease line or other communication link to the remote resource service, etc.), and forwards the communication to the determined remote resource service. The communication being forwarded may, for example, be sent over the Internet or one or more other public networks, or may instead in some embodiments be sent via a private communication link or other secure connection. After block 745, the routine continues to block 799 and ends.

Figure 8:
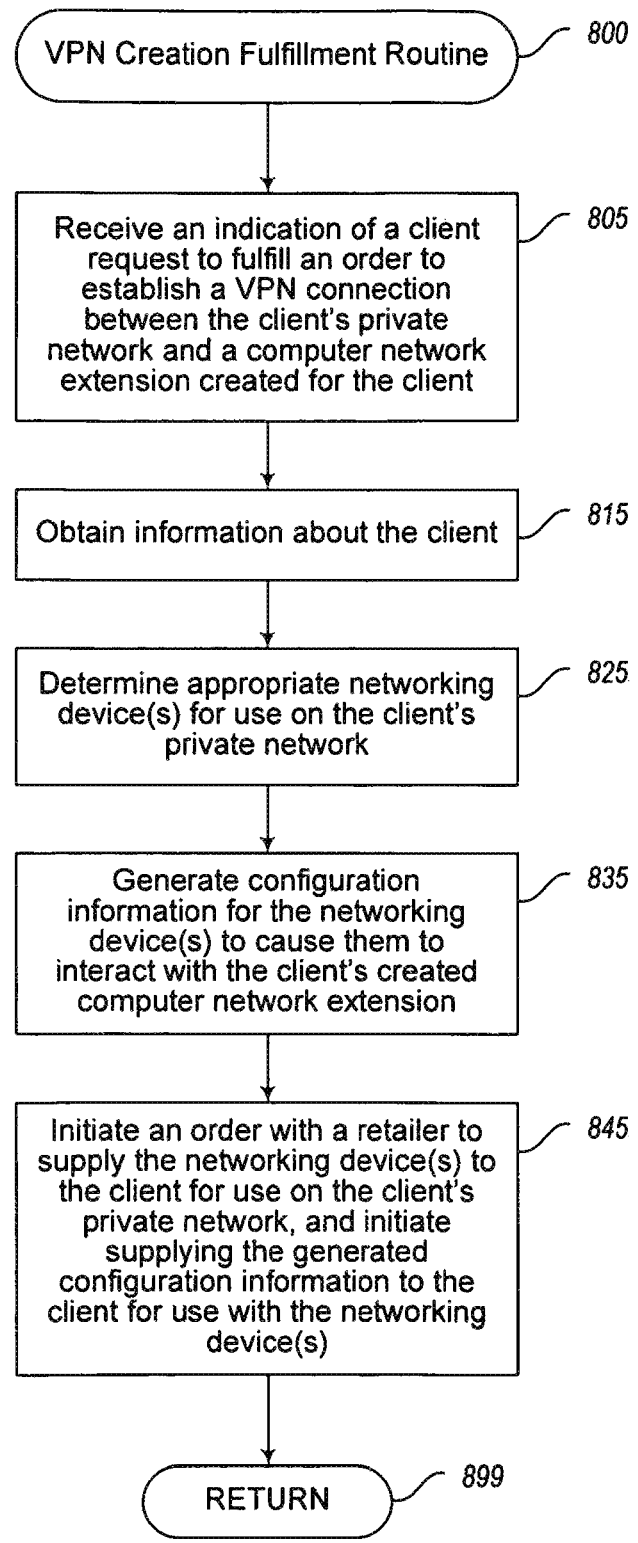
FIG. 8 illustrates a flow diagram of an example embodiment of a VPN Creation Fulfillment routine.

FIG. 8 is a flow diagram of an example embodiment of a VPN Creation Fulfillment routine 800. The routine may be provided by, for example, execution of the configurable network service manager module, such as may be initiated based on execution of block 425 of FIG. 4 resulting from a client invocation of a remote access establishment API provided by an embodiment of the configurable network service.

In the illustrated embodiment, the routine begins at block 805, where an indication is received of a client request to establish a VPN connection from a remote location of the client (e.g., a remote private computer network of the client) to a provided computer network for the client (e.g., a network extension that is provided by the configurable network service for the remote private computer network of the client). In at least some embodiments, the request by the client to establish the VPN connection is part of a request to fulfill an order for one or more appropriate networking devices and corresponding software and/or configuration information to be provided to the remote location of the client, so as to enable the VPN connection to be established from one or more computing systems at the remote client location to the computer network provided for the client by the configurable network service. In at least some such embodiments, the fulfillment of the order may be performed by the configurable network service without any further actions by the client after the invocation of the remote access establishment API or other initiation of the request from the client, while in other embodiments some additional interactions with the client may be performed as part of the fulfillment of the order (e.g., presenting options to the client, obtaining additional information from the client, obtaining payment information from the client, etc.).

In block 815, the routine then obtains various information about the client for use in fulfilling the request, such as may be supplied in the request received in block 805, previously received from the client and retrieved from an account of the client with the configurable network service, and/or dynamically obtained from the client and/or one or more external sources. The obtained information may have various forms, such as information about a geographical location of the client to which networking device(s) and other items may be physically delivered, an electronic communication address to which electronic information may be electronically delivered, payment information via which the client will pay a fee associated with the request received in block 805, etc. In addition, various information may be obtained to assist in configuring the VPN connection between the remote client location and the provided computer network for the client, such as a network address that is publicly accessible from the remote client location (or other corresponding connection information) to initiate the VPN connection, a unique identifier or other information for use in identifying the provided computer network to which the VPN connection is to be established, etc.

After block 815, the routine continues to block 825 to determine one or more appropriate networking devices for use with the client's one or more remote computing systems to establish the VPN connection to the provided computer network. As discussed in greater detail elsewhere, the appropriate networking devices may be determined in various manners, such as based on information specific to the provided computer network for the client, to the remote computing systems of the client, and/or to the configurable network service (e.g., based on networking devices used as part of the substrate network of the configurable network service or other infrastructure of the configurable network service). Furthermore, the determination of the appropriate networking device(s) may be made in various manners in various embodiments, such as automatically by the configurable network service and/or based at least in part on information from the client (e.g., based on a selection by the client as part of the request received in block 805 or as otherwise specified by the client, such as to choose between multiple alternatives presented to the client).

After block 825, the routine continues to block 835 to generate configuration information for the determined networking device(s) for use in preparing the networking device(s) to connect to the provided computer network for the client, although in other embodiments the routine may instruct a third-party entity to generate the configuration information (e.g., the same retailer that will be contacted in block 845). In at least some embodiments, the configuration information for the determined networking devices will cause the configured networking devices to initiate contact with the configurable network service to complete the configuration of the configured networking devices (e.g., by obtaining additional information from the configurable network service to configure the networking device(s) in a manner specific to a particular provided computer network). In addition, in at least some embodiments, the configuration information for the determined networking devices will cause the configured networking devices to initiate contact with the client's provided computer network, such as to establish the VPN connection to the provided computer network. The generated configuration information may in some embodiments be specific to the types of determined networking device(s) and/or to the provided computer network to which the determined networking device(s) will establish the VPN connection, and the generating of the configuration information may include retrieving previously prepared configuration information and/or dynamically creating new configuration information (e.g., by modifying previously prepared configuration information in a manner specific to the determined networking device(s) and/or to the provided computer network, such as if the previously prepared configuration information is for use with any networking device(s) and/or with any provided computer networks). The generated configuration information may similarly have various forms, such as configured software to be executed on a hardware device, textual instructions for use by a human operator at the remote location, etc.

In block 845, the routine then initiates an order with a retailer to supply the determined networking device(s) to the remote client location for use with one or more remote computing systems of the client, and in the illustrated embodiment to further initiate supplying the generated configuration information to the client for use with the networking devices. In such embodiments, the generated configuration information may be provided to the retailer in various manners, such as by sending the configuration information as part of the order, by previously instructing the retailer in block 835 to generate the configuration information, etc. As discussed in greater detail elsewhere, the generated configuration information may be supplied to the client in various manners, including one or more of the following: by storing the generated configuration information on a physical device-readable storage medium (e.g., a CD, DVD, USB memory key, etc.) that is physically delivered to the client; by configuring the networking device(s) with the generated configuration information before they are delivered to the client (e.g., by loading the generated configuration information onto the networking device(s) at a fulfillment center used by the retailer); by transmitting the generated configuration information to the client electronically; etc. In other embodiments, the networking device(s) and/or the configuration information may be provided to the client in other manners, such as by having one or both of the networking devices and generated configuration supplied directly by the configurable network service rather than a retailer, by using a first retailer to supply the networking devices and a distinct second retailer to supply the generated configuration information, by using one or more third parties that are not retailers, etc. After block 845, the routine continues to block 899 and returns.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method, comprising:
performing, by one or more computer systems that implement a configurable network service (CNS):
receiving from a client configuration information to create a virtual network of virtual machines to be hosted by the CNS and a range of virtual network addresses to be assigned to the virtual machines, and in response:
provisioning a virtual machine of the virtual network on a selected server of the CNS;
assigning a virtual network address from the range of virtual network addresses to the virtual machine;
configuring a communication manager to modify communications to and from the virtual machine to enable sending and receiving of the communications to and from other virtual machines of the virtual network via their respective virtual network addresses in accordance with the configuration information; and
providing the client access to the virtual network;
receiving from the client a request to establish a virtual private network (VPN) connection between the virtual network and a private network at a remote location of the client, and in response:
determining a type of networking device for use on the private network to establish the VPN connection, wherein the type of networking device is selected by the client from multiple types of networking devices presented to the client; and
generating device configuration information specific to the type of networking device to prepare the type of networking device to establish the VPN with the virtual network, wherein the generation includes modifying configuration software for the networking device in a manner specific to the virtual network; and
establishing the VPN connection with the private network via a networking device on the private network, wherein the networking device is configured using the device configuration information.

2. The computer-implemented method of claim 1, wherein the device configuration information causes the networking device to initiate contact with the CNS to obtain additional information to complete configuration the networking device.

3. The computer-implemented method of claim 1, wherein the device configuration information causes the networking device to initiate contact with the virtual network to establish the VPN connection.

4. The computer-implemented method of claim 1, wherein the device configuration information includes one or more credentials to establish VPN connection.

5. The computer-implemented method of claim 1, wherein the device configuration information includes one or more access points to use to establish VPN connection.

6. The computer-implemented method of claim 1, wherein the generation of the device configuration information comprises:
modifying previously prepared information in a manner specific to the type of network device selected.

7. The computer-implemented method of claim 1, wherein the client configuration to create a virtual network is received as part of a request to create an extension of private network at the remote location.

8. The computer-implemented method of claim 1, further comprising performing, by the CNS:
configuring a VPN mechanism hosted by the CNS to enable the establishment of the VPN connection.

9. The computer-implemented method of claim 8, wherein the VPN mechanism is configured to:
secure communications over the VPN connection using an Internet Protocol Security (IPsec) protocol.

10. The computer-implemented method of claim 1, wherein the VPN mechanism is an external communication manager of the CNS configured to:
encode outgoing communications for the VPN connection; and
decode incoming communications from the VPN connection.

11. A system comprising:
one or more computer systems that implement a configurable network service (CNS), configured to:
receive from a client configuration information to create a virtual network of virtual machines to be hosted by the CNS and a range of virtual network addresses to be assigned to the virtual machines, and in response:
provision a virtual machine of the virtual network on a selected server of the CNS;
assign a virtual network address from the range of virtual network addresses to the virtual machine;
configure a communication manager to modify communications to and from the virtual machine to enable sending and receiving of the communications to and from other virtual machines of the virtual network via their respective virtual network addresses in accordance with the configuration information; and
provide the client access to the virtual network;
receive from the client a request to establish a virtual private network (VPN) connection between the virtual network and a private network at a remote location of the client, and in response:
determine a type of networking device for use on the private network to establish the VPN connection, wherein the type of networking device is selected by the client from multiple types of networking devices presented to the client; and
generate device configuration information specific to the type of networking device to prepare the type of networking device to establish the VPN with the virtual network, wherein the generation includes modifying configuration software for the networking device in a manner specific to the virtual network; and establish the VPN connection with the private network via a networking device on the private network, wherein the networking device is configured using the device configuration information.

12. The system of claim 11, wherein the device configuration information causes the networking device to contact the CNS to obtain additional information to complete configuration the networking device.

13. The system of claim 11, wherein the device configuration information causes the networking device to contact with the virtual network to establish the VPN connection.

14. The system method of claim 11, wherein the device configuration information includes one or more credentials to establish VPN connection.

15. The system of claim 11, wherein the device configuration information includes one or more access points to use to establish VPN connection.

16. The system of claim 11, wherein to generate the device configuration information, the CNS is configured to:
modify previously prepared configuration information in a manner specific to the type of network device selected.

17. The system of claim 11, wherein:
the CNS implements a remote access establishment interface; and
the client configuration to create a virtual network is received via the remote access establishment interface.

18. The system of claim 11, wherein the CNS is configured to:
configure a VPN mechanism hosted by the CNS to manage the VPN connection, including to:
encode outgoing communications for the VPN connection; and
decode incoming communications from the VPN connection.

19. The system of claim 11, wherein the CNS is configured to:
configure a VPN mechanism hosted by the CNS to manage the VPN connection, including to secure communications over the VPN connection using an Internet Protocol Security (IPsec) protocol.

20. One or more non-transitory computer-readable media storing program instructions that when executed on or across one or more processors implement portions of a configurable network service (CNS) and cause the CNS to:
receive from a client configuration information to create a virtual network of virtual machines to be hosted by the CNS and a range of virtual network addresses to be assigned to the virtual machines, and in response:
provision a virtual machine of the virtual network on a selected server of the CNS;
assign a virtual network address from the range of virtual network addresses to the virtual machine;
configure a communication manager to modify communications to and from the virtual machine to enable sending and receiving of the communications to and from other virtual machines of the virtual network via their respective virtual network addresses in accordance with the configuration information; and
provide the client access to the virtual network;
receive from the client a request to establish a virtual private network (VPN) connection between the virtual network and a private network at a remote location of the client, and in response:
determine a type of networking device for use on the private network to establish the VPN connection, wherein the type of networking device is selected by the client from multiple types of networking devices presented to the client; and
generate device configuration information specific to the type of networking device to prepare the type of networking device to establish the VPN with the virtual network, wherein the generation includes modifying configuration software for the networking device in a manner specific to the virtual network; and
wherein the VPN connection is subsequently established with the private network via a networking device on the private network that is configured using the device configuration information.

* * * * *